(12) United States Patent
Hatano

(10) Patent No.: US 8,955,061 B2
(45) Date of Patent: Feb. 10, 2015

(54) INFORMATION PROCESSING APPARATUS, AUTHENTICATION SYSTEM, AUTHENTICATION METHOD, AND PROGRAM

(71) Applicant: Canon Kabushiki Kaisha, Tokyo (JP)

(72) Inventor: Manami Hatano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 23 days.

(21) Appl. No.: 13/990,633

(22) PCT Filed: Apr. 10, 2013

(86) PCT No.: PCT/JP2013/061343
§ 371 (c)(1),
(2) Date: May 30, 2013

(87) PCT Pub. No.: WO2013/161635
PCT Pub. Date: Oct. 31, 2013

(65) Prior Publication Data
US 2014/0082700 A1   Mar. 20, 2014

(30) Foreign Application Priority Data

Apr. 25, 2012   (JP) .................................. 2012-100353

(51) Int. Cl.
*H04L 29/06* (2006.01)
*G06F 21/36* (2013.01)

(52) U.S. Cl.
CPC ................ *H04L 63/08* (2013.01); *G06F 21/36* (2013.01)
USPC ........ 726/4; 726/2; 726/3; 713/168; 713/169; 713/170; 713/171; 713/172; 713/173; 713/174; 709/225; 709/229

(58) Field of Classification Search
CPC .................................................... H04L 9/3236
USPC ............ 713/168–174; 709/225, 229; 726/2–4
See application file for complete search history.

(56) References Cited

U.S. PATENT DOCUMENTS

| | | | |
|---|---|---|---|
| 5,559,961 A * | 9/1996 | Blonder .......................... | 726/18 |
| 8,086,745 B2 | 12/2011 | Liew et al. | |
| 8,156,562 B2 * | 4/2012 | Kawase et al. .................. | 726/26 |
| 2010/0169958 A1 | 7/2010 | Werner et al. | |
| 2011/0072493 A1 * | 3/2011 | Morishita et al. ................. | 726/3 |
| 2012/0239727 A1 * | 9/2012 | Dutta et al. .................... | 709/203 |

FOREIGN PATENT DOCUMENTS

| | | |
|---|---|---|
| JP | 10-124458 A | 5/1998 |
| JP | 2003-228553 A | 8/2003 |

(Continued)

OTHER PUBLICATIONS

International Search Report and Written Opinion dated Jun. 5, 2013, issued in International Application No. PCT/JP2013/061343.

(Continued)

*Primary Examiner* — Josnel Jeudy
(74) *Attorney, Agent, or Firm* — Fitzpatrick, Cella, Harper & Scinto

(57) ABSTRACT

An information processing apparatus for executing authentication processing, characterized by comprises: storage means for storing, in association with each other, an image, region information indicating a region included in the image, and word information indicating an object linked with the region; determination means for determining an image to be used for the authentication processing among the images stored in the storage means; display means for displaying the image determined by the determination means; specification means for specifying, in a case where a user designates a position within the image displayed by the display means, word information associated with region information of a region including the position; and authentication means for executing authentication processing using the word information specified by the specification means.

16 Claims, 25 Drawing Sheets

(56) References Cited

FOREIGN PATENT DOCUMENTS

| | | |
|---|---|---|
| JP | 2004-157675 A | 6/2004 |
| JP | 2010-055602 A | 3/2010 |
| JP | 2011-128726 A | 6/2011 |

OTHER PUBLICATIONS

Wiedenbeck, et al., "PassPoints: Design and Longitudinal evaluation of a graphical password system", International Journal of Human-Computer Studies, vol. 63, Jul. 2005.

* cited by examiner

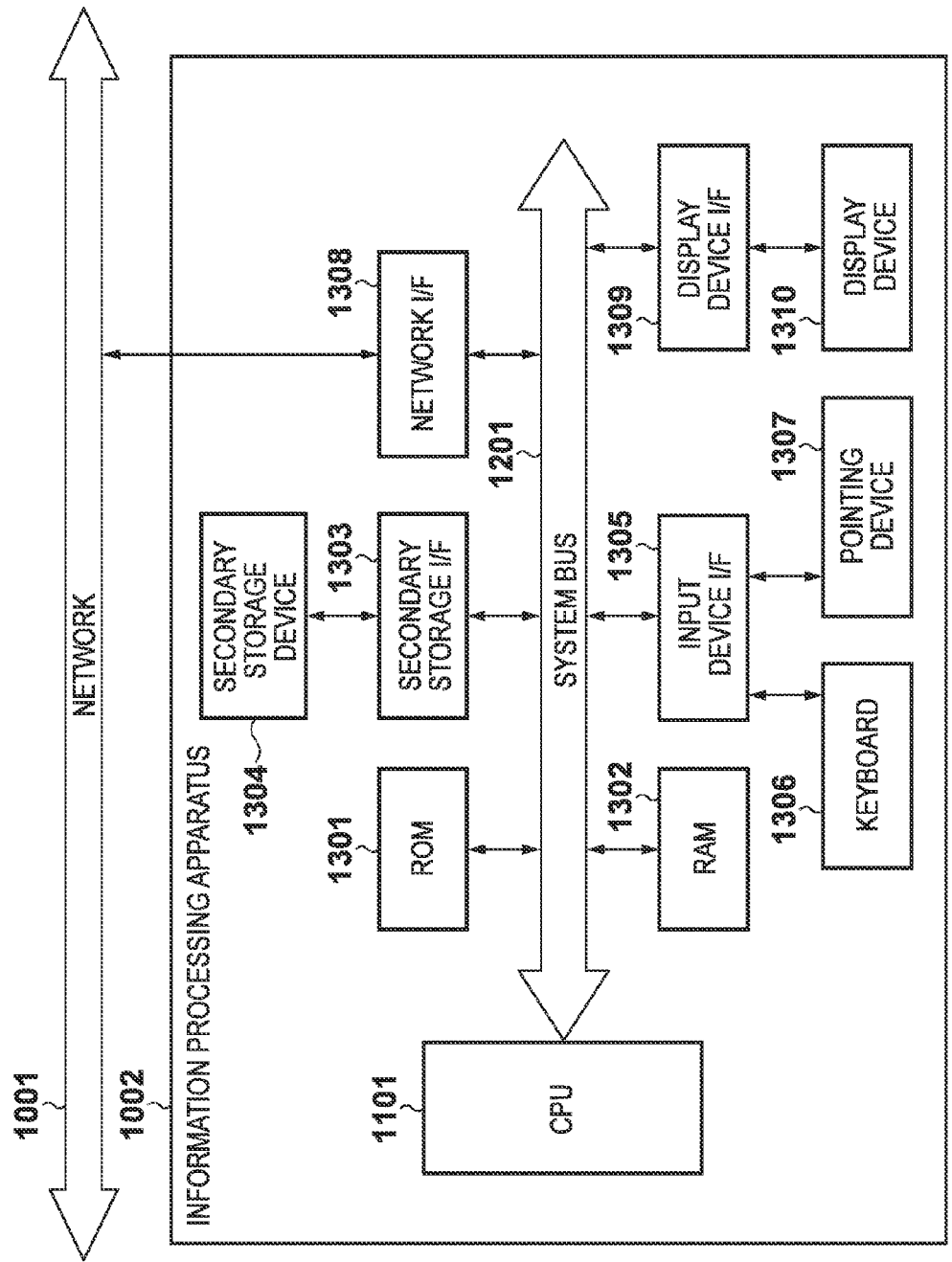

FIG. 9
7001
9101     9102     9103
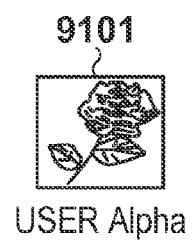 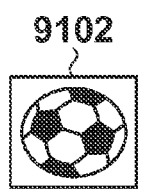 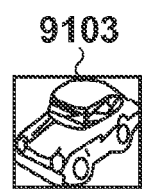
USER Alpha    USER Beta    USER Gamma

F I G. 10A
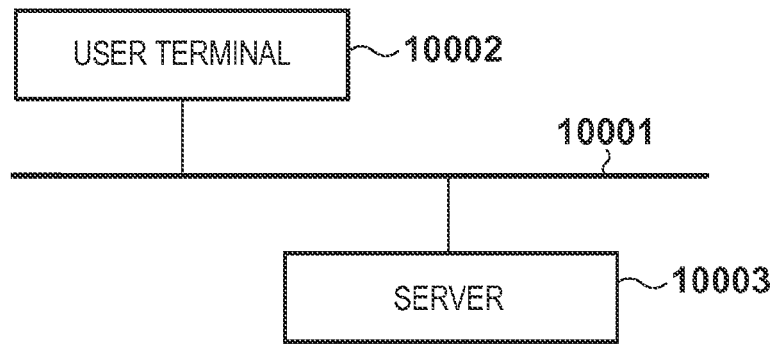
F I G. 10B
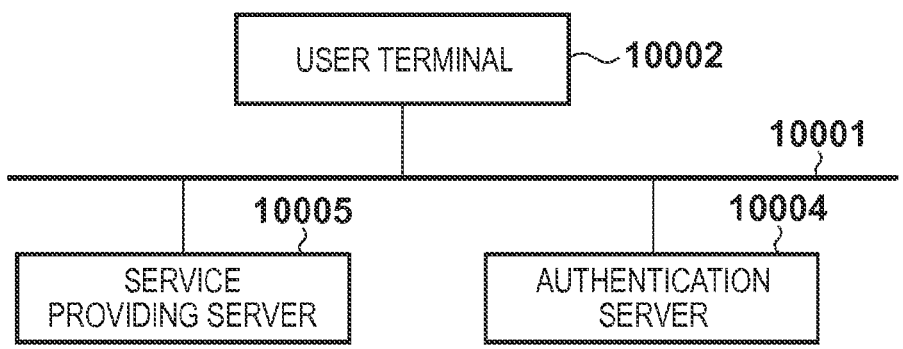
F I G. 10C
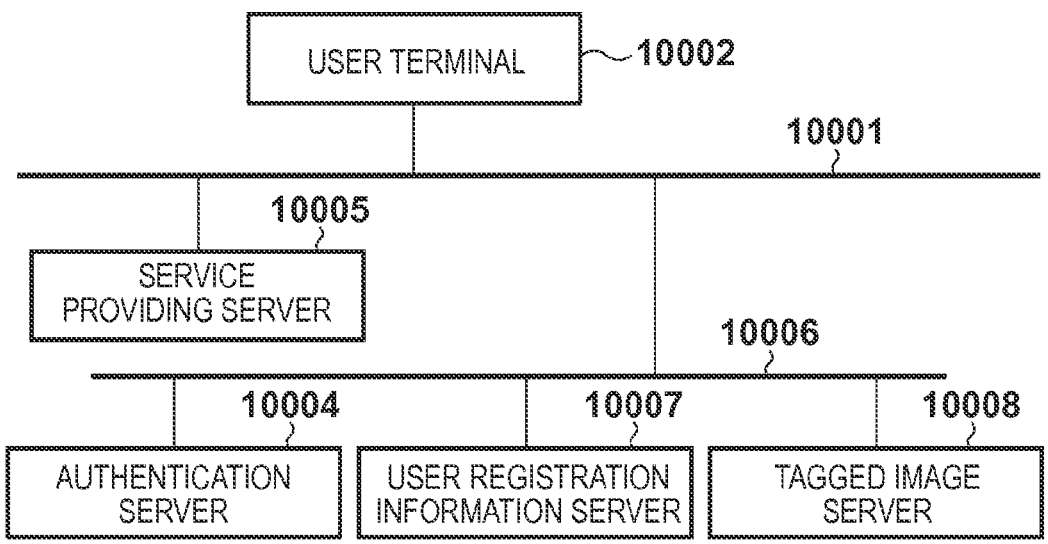

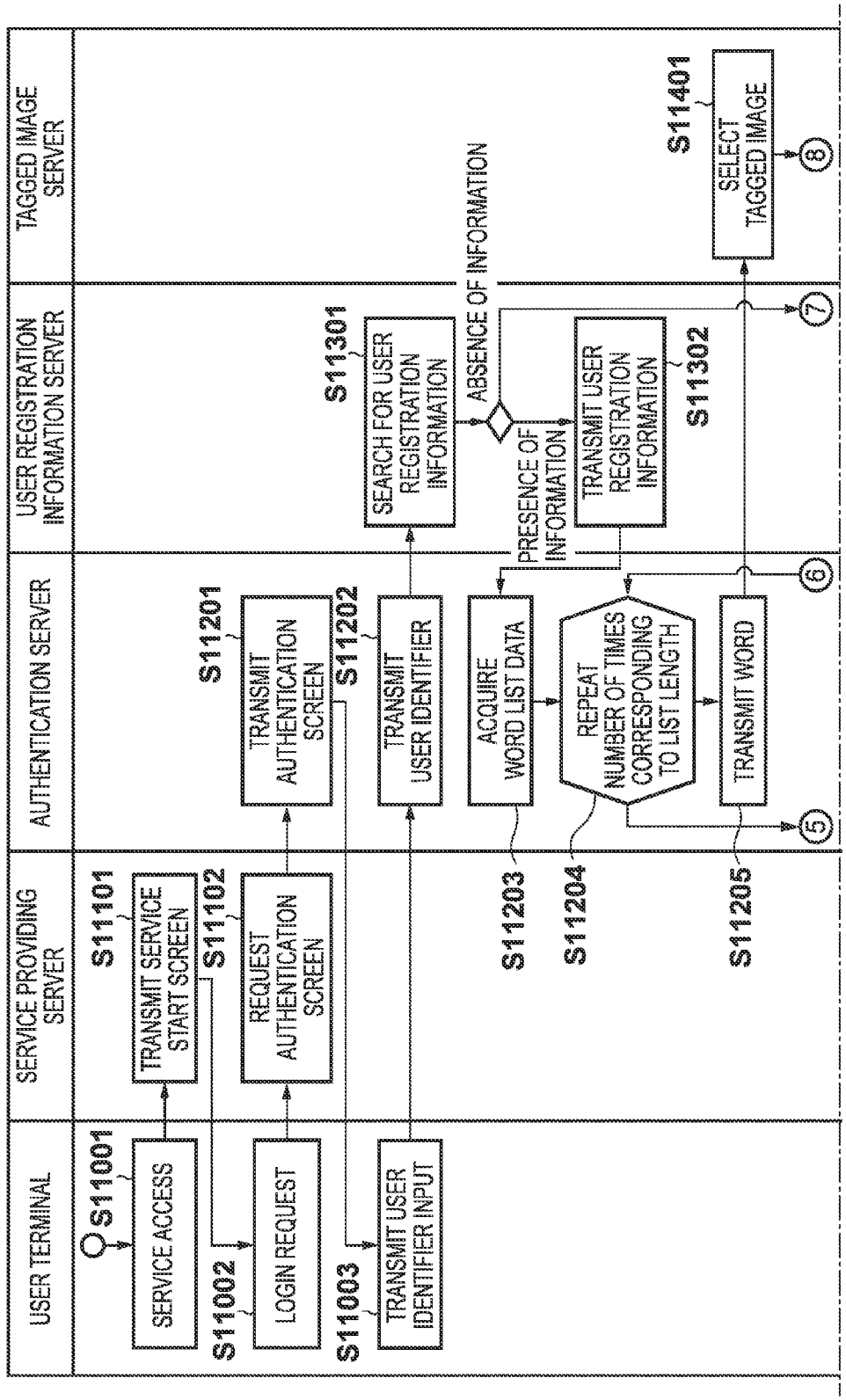

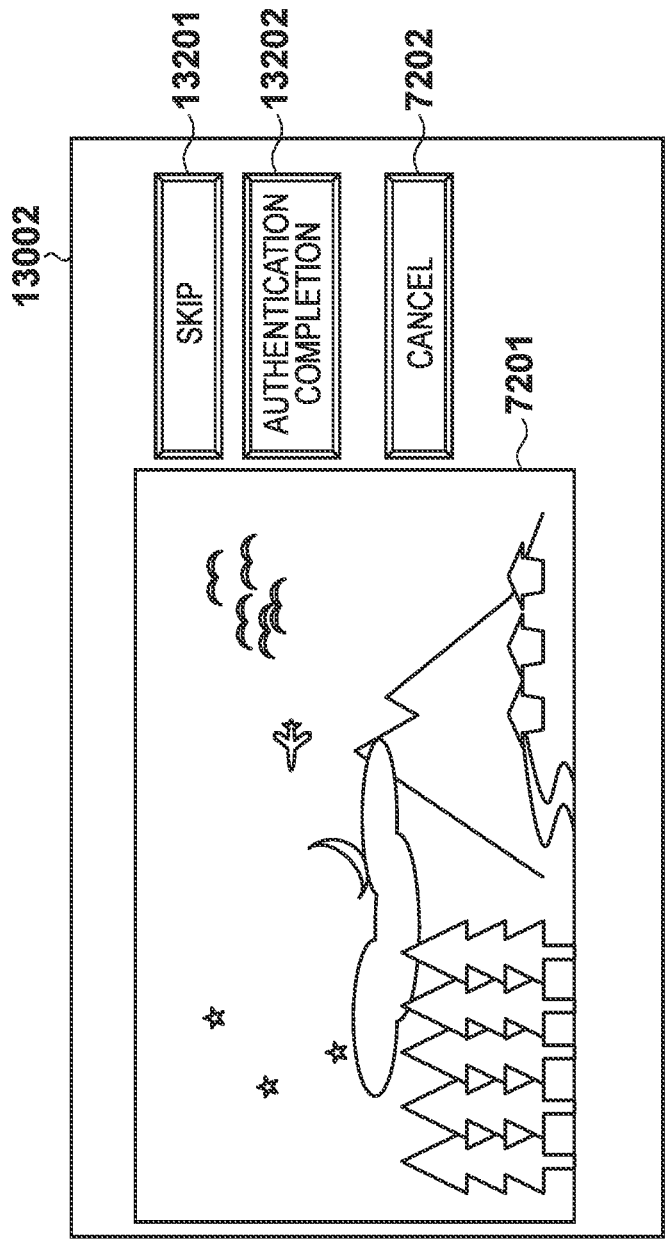

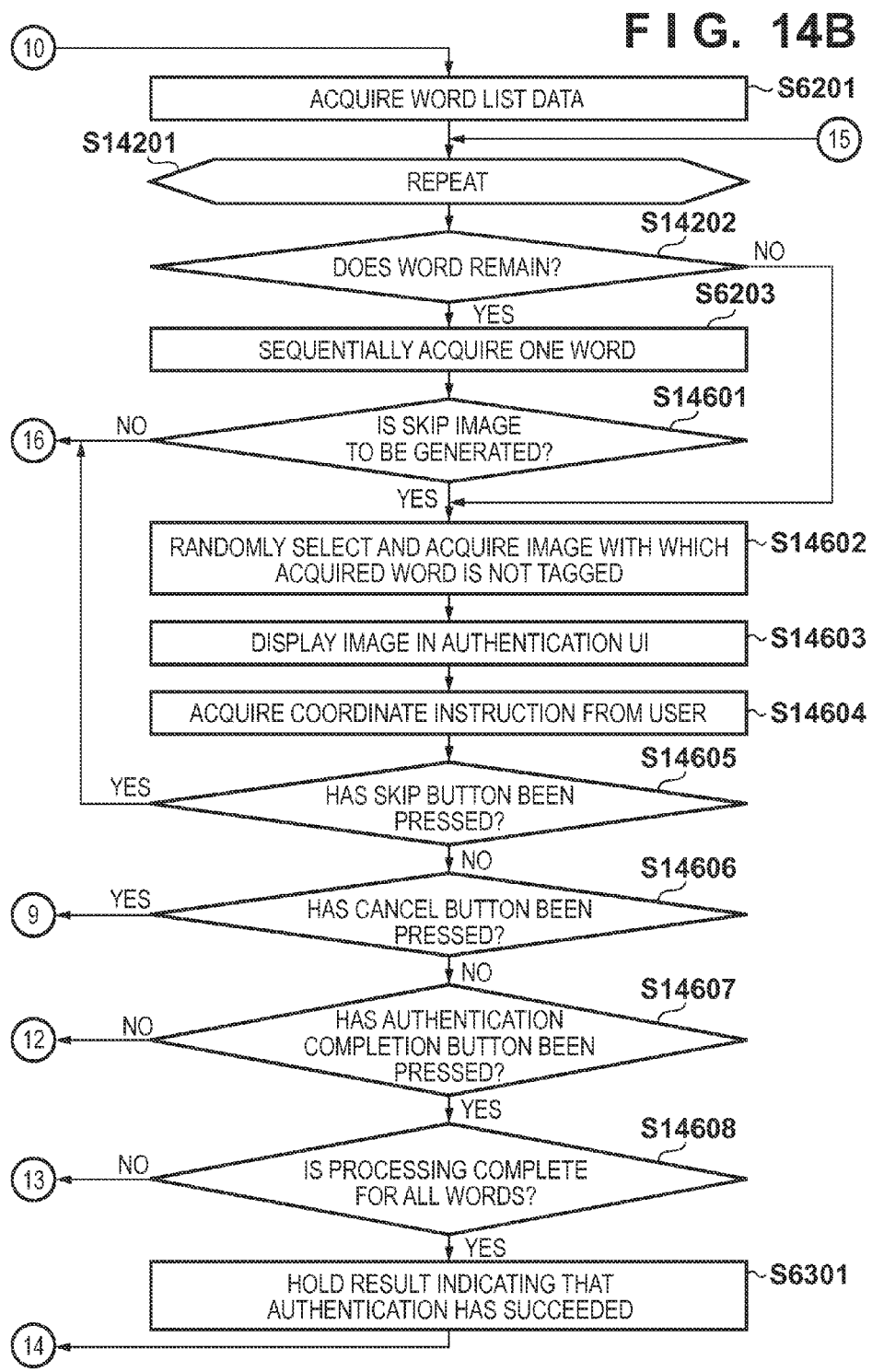

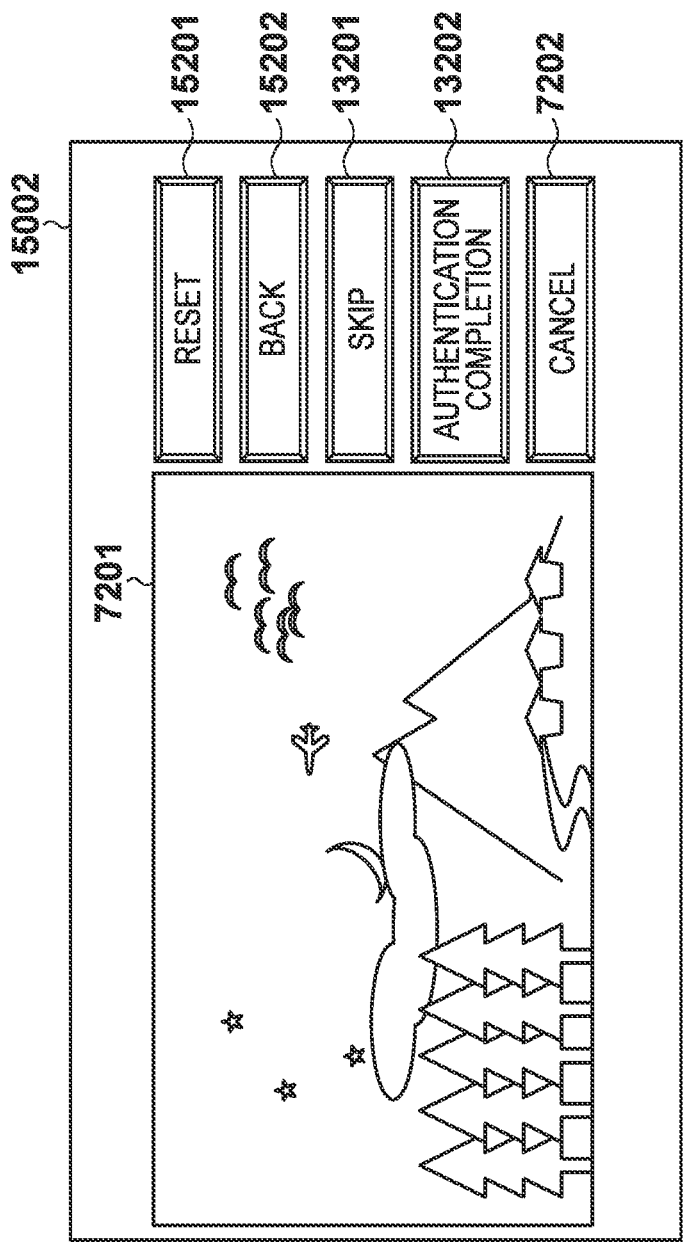

INFORMATION PROCESSING APPARATUS, AUTHENTICATION SYSTEM, AUTHENTICATION METHOD, AND PROGRAM

TECHNICAL FIELD

The present invention relates to an information processing apparatus, authentication system, authentication method, and program for performing authentication to confirm an access right.

BACKGROUND ART

In a conventional information system, authentication methods are often used in which a user and system share specific secret information such as a password, and correctly instructing the secret information by the user is considered as the certificate of an access right.

Some of such methods are characterized by using images. For example, there is a method characterized in that only one predetermined image is arranged together with a plurality of random images (see Japanese Patent Laid-Open No. 2003-228553). In this method, authentication is performed when the user correctly selects the predetermined image.

There is also provided a method in which random images and a predetermined image are not arranged in a matrix but provided as a collage of those images (see Japanese Patent Laid-Open No. 2010-55602). In this method, authentication is performed when the user correctly selects a fragment of the predetermined image.

Moreover, in a method in which authentication is performed when screens in each of which a plurality of random images are arranged are sequentially presented, and the user correctly selects a predetermined image from the arranged images, a screen without the predetermined image is presented (see Japanese Patent Laid-Open No. 2004-157675). In this case, the user instructs not to select any image in a screen which includes no image to be selected, thereby performing authentication. There is also provided a method of performing authentication by instructing predetermined coordinates within an image in a predetermined order (see Wiedenbeck, Waters, Birget, Brodskiy, and Memon, "PassPoints: design and longitudinal evaluation of a graphical password system", International Journal of Human-Computer Studies-Special issue: HCI research in privacy and security is critical now, Volume 63, Issue 1-2, July 2005, searched 11 Apr. 2012 for <http://clam.rutgers.edu/~birget/grPssw/susan1.pdf*>). Furthermore, there is provided a method of performing authentication by giving an instruction by tracing a predetermined locus within an image.

Among these techniques, however, the method of performing authentication by selecting a predetermined image has the following problem. That is, a third party who knows personal information about the user can identify an image to be selected by the user based on the personal information. If, for example, an image to be selected is a photo of a relative of the user, a third party may know the relative. In this case, authentication may succeed at a high probability. An attack method in which a third party performs authentication by such a method is called an educated-guess attack.

Furthermore, these techniques require a predetermined image to be always displayed in one of screens. Making several tries, therefore, enables to specify an image which appears every time. This may allow a third party to identify an image to be selected. An attack method in which a third party performs authentication by such a method is called an intersection attack.

As described above, an authentication system adopting the conventional technique is vulnerable to the educated-guess attack or intersection attack.

From a different viewpoint, the present invention has another problem. Among the conventional techniques, the method of performing authentication by sequentially selecting specific coordinates by the user or tracing a specific locus by the user has the following problem. That is, in the above-described conventional techniques, the coordinates and locus themselves are secret information, and may be easily stolen when a third party glances furtively at the information or performs wiretapping on a communication path.

The present invention solves at least one of the above-described problems.

SUMMARY OF INVENTION

According to one aspect of the present invention, there is provided an information processing apparatus for executing authentication processing, characterized by comprising: storage means for storing, in association with each other, an image, region information indicating a region included in the image, and word information indicating an object linked with the region; determination means for determining an image to be used for the authentication processing among the images stored in the storage means; display means for displaying the image determined by the determination means; specification means for specifying, in a case where a user designates a position within the image displayed by the display means, word information associated with region information of a region including the position; and authentication means for executing authentication processing using the word information specified by the specification means.

According to another aspect of the present invention, there is provided an authentication system comprising an information processing apparatus and an authentication server, characterized in that the authentication server includes storage means for storing, in association with each other, an image, region information indicating a region included in the image, and word information indicating an object associated with the region, determination means for determining an image to be used for authentication processing among the images stored in the storage means, transmission means for transmitting the image determined by the determination means to the information processing apparatus, specification means for specifying, based on a position within the determined image acquired from the information processing apparatus, word information associated with region information of a region including the position, and authentication means for executing the authentication processing using the word information specified by the specification means, and the information processing apparatus includes reception means for receiving the determined image from the authentication server, display means for displaying the image received by the reception means, and providing means for providing, in a case where the user designates a position within the image displayed by the display means, information of the designated position to the authentication server.

According to another aspect of the present invention, there is provided an authentication method characterized by comprising: a storage step of storing, in a storage unit, in association with each other, an image, region information indicating a region included in the image, and word information indicating an object included in the region; a determination step of determining an image to be used for authentication processing among the images stored in the storage unit; a display step of displaying the image determined in the determination step; a specification step of specifying, in a case where a user designates a position within the image displayed in the display step, word information associated with region information of a region including the position; and an authentication step of executing authentication processing using the word information specified in the specification step.

According to another aspect of the present invention, there is provide a program for causing a computer to function as storage means for storing, in association with each other, an image, region information indicating a region included in the image, and word information indicating an object associated with the region; determination means for determining an image to be used for authentication processing among the images stored in the storage means; display means for displaying the image determined by the determination means; specification means for specifying, in a case where a user designates a position within the image displayed by the display means, word information associated with region information of a region including the position; and authentication means for executing authentication processing using the word information specified by the specification means.

According to the present invention, there is provided an authentication method which can resist the intersection attack or educated-guess attack, or resist wiretapping as compared with the conventional image authentication method using coordinate selection.

Further features of the present invention will become apparent from the following description of exemplary embodiments (with reference to the attached drawings).

BRIEF DESCRIPTION OF DRAWINGS

FIG. 1 is a block diagram showing an example of the arrangement of an information processing apparatus according to the first, third, and fourth embodiments;

FIG. 9 is a view showing an example of a user interface for instructing a user identifier according to the first to fourth embodiments;

FIGS. 10A, 10B, and 10C are block diagrams each showing an example the arrangement of an authentication system according to the second to fourth embodiments;

FIGS. 11A and 11B are sequence charts showing a processing procedure according to the second embodiment;

FIG. 13 is a view showing an example of the image authentication screen of the authentication user interface according to the third embodiment;

FIGS. 14A, 14B, and 14C are flowcharts illustrating a processing procedure according to the third embodiment;

FIG. 15 is a view showing an example of the image authentication screen of the authentication user interface according to the fourth embodiment;

DESCRIPTION OF EMBODIMENTS

Modes for carrying out the present invention will be described below with reference to the accompanying drawings.

<First Embodiment>
[System Arrangement]

FIG. 1 schematically shows the internal arrangement of an information processing apparatus on which an authentication system according the first embodiment of the present invention operates. Note that as the information processing apparatus according to the embodiment, a general personal computer (PC) or a portable terminal is applicable. An information processing apparatus 1002 is connected to a network 1001, and can communicate with an external apparatus. Each component of the information processing apparatus 1002 will be described. A CPU 1101 is a central processing unit. One CPU may be included as shown in FIG. 1 or a plurality of CPUs may be included. A system bus 1201 connects the respective components of the information processing apparatus 1002 with each other, and is used to transmit/receive information between them.

A ROM 1301 is a read only memory, and stores various programs and data. A RAM 1302 is a readable/writable memory, and is used as a work area or the like in execution of a program.

A secondary storage device 1304 is a secondary storage device, and is implemented by an HDD of a non-volatile storage area. The secondary storage device 1304 stores various programs and the like. A secondary storage I/F 1303 is a secondary storage interface for connecting the secondary storage device 1304 to the system bus 1201 (an interface will be referred to as an I/F hereinafter).

A keyboard 1306 and a pointing device 1307 serve as input devices. An example of the pointing device 1307 is a mouse or the like. An input device I/F 1305 is used to connect the keyboard 1306, the pointing device 1307, and the like to the system bus 1201.

A network I/F 1308 is an interface for connecting the network 1001 and the information processing apparatus 1002 with each other, and is located between the network 1001 and the system bus 1201.

A display device 1310 is used to provide various user interfaces (to be referred to as UIs hereinafter) to the user. Note that the display device 1310 according to the embodiment includes a touch panel, and may be configured to accept an instruction from the user when, for example, he/she touches the touch panel. A display device I/F 1309 is used to connect the system bus 1201 and the display device 1310 with each other.

[Module Arrangement]

Figure 2A:
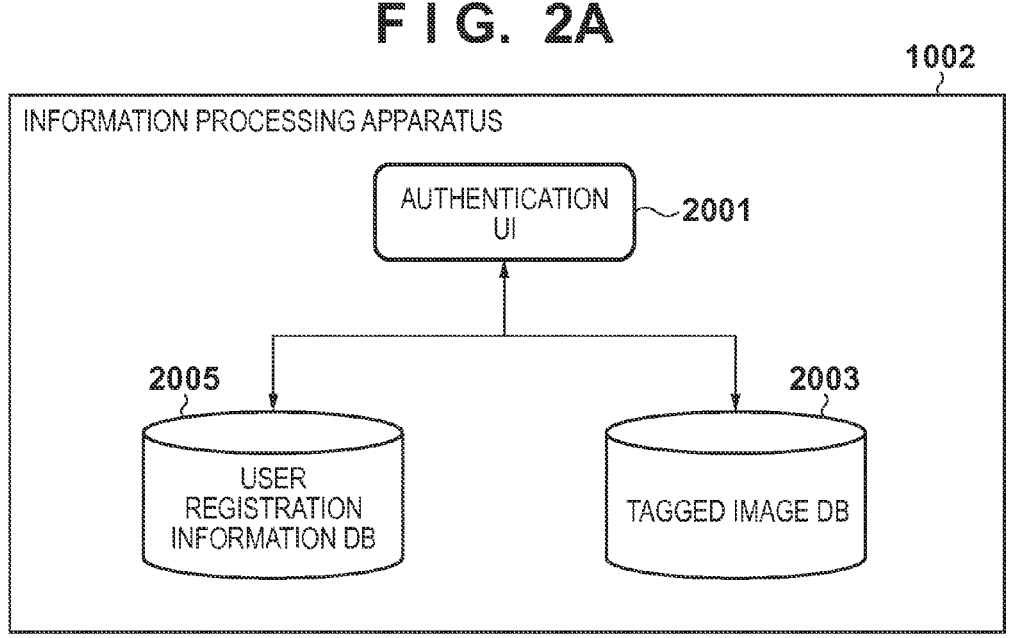
FIGS. 2A and 2B are block diagrams showing an example of a software module arrangement according to the first, third, and fourth embodiments.
Figure 2B:
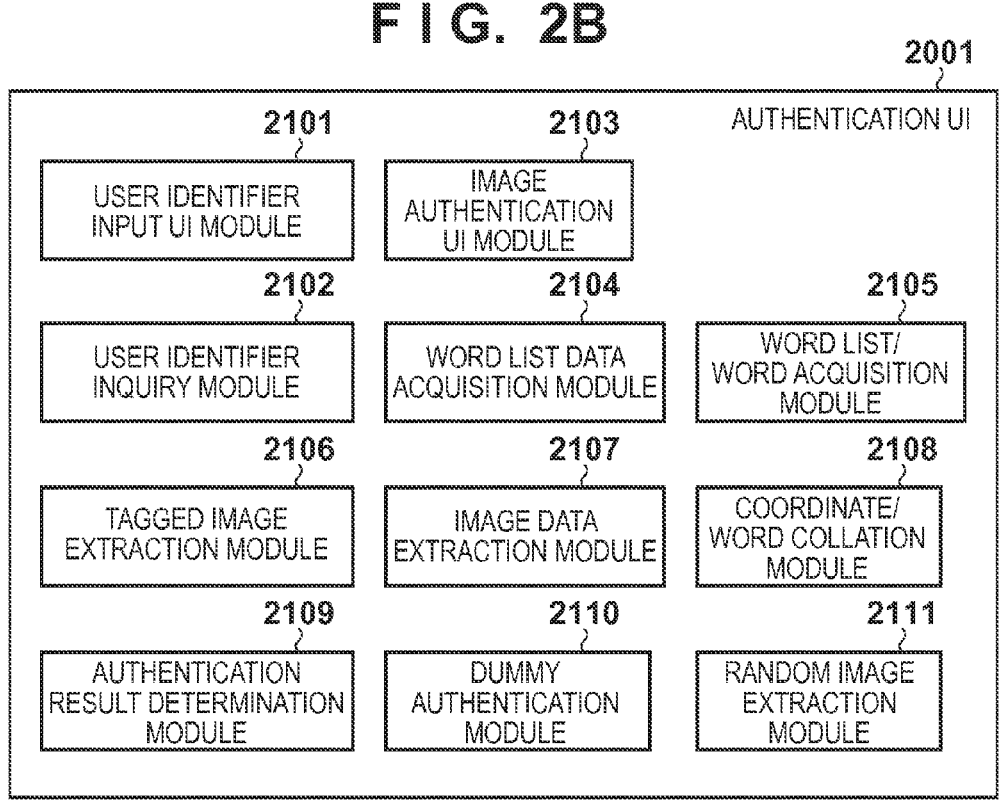

FIGS. 2A and 2B schematically show the module arrangement of the authentication system according to the first embodiment of the present invention. FIG. 2A will be described. An authentication UI 2001 provides the user with various UIs associated with authentication via the display device 1310. A tagged image database 2003 (a database will be referred to as a DB hereinafter) stores tagged image data. A user registration information DB 2005 (a second storage means) stores user registration information. The tagged image data and the user registration information will now be described with reference to FIGS. 3A to 3C.

(Data Structure)

Figure 3A:
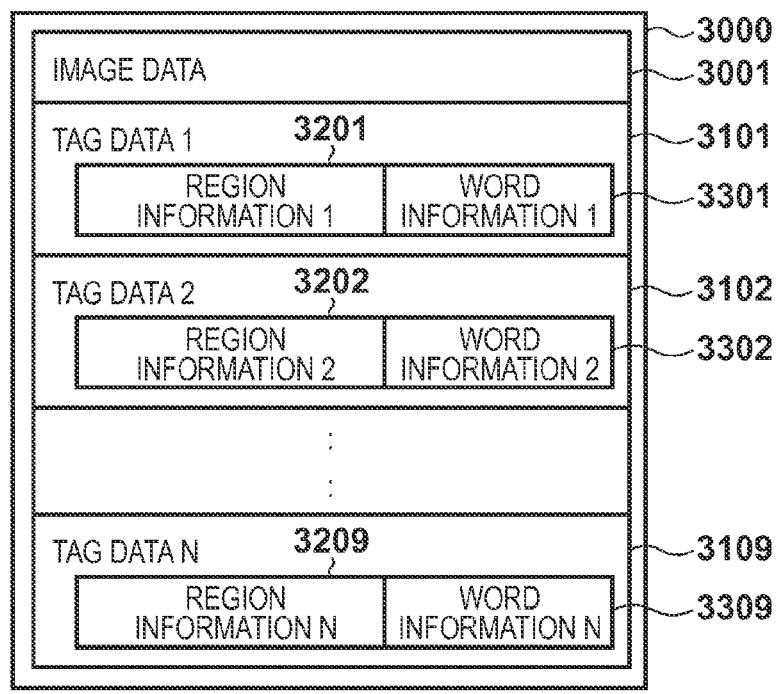
FIGS. 3A, 3B, and 3C are views showing an example of the structure of tagged image data.

FIG. 3A schematically shows an example of the tagged image data held in the tagged image DB 2003. Tagged image data 3000 represents the whole tagged image data. Image data 3001 indicates image data itself in the tagged image data 3000. Furthermore, the tagged image data 3000 includes tag data 1 to N (N is an arbitrary number). In this example, tag data 1 3101, tag data 2 3102, ..., tag data N 3109 are shown as tag data. Assume that one tagged image data 3000 is attached with at least one or more tag data. Tag data attached to each tagged image data may be added or deleted in response to a user instruction or the like.

Each tag data includes region information and word information. In this example, for example, the tag data 1 3101 includes region information 3201 and word information 3301. Similarly, the tag data 2 3102 includes region information 3202 and word information 3302, and the tag data N 3109 includes region information N 3209 and word information N 3309.

Figure 3B:
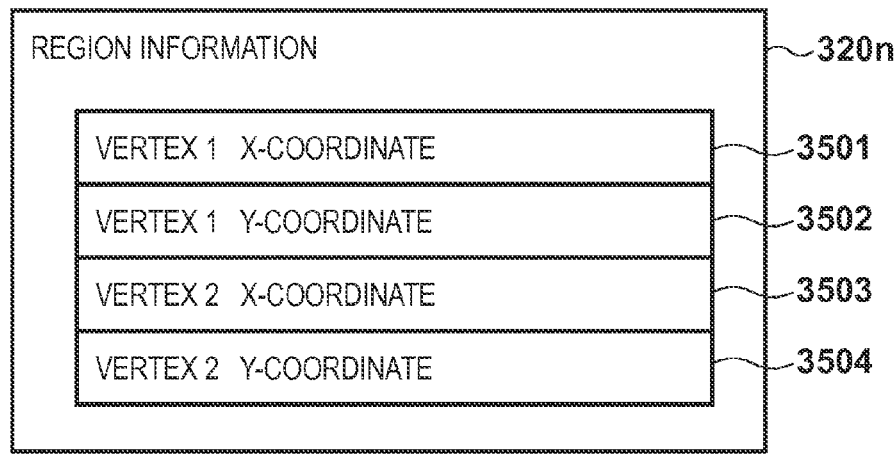

FIG. 3B shows an example of the structure of the region information. The coordinates of a rectangle on the image data 3001 represent nth region information 320n (n is an arbitrary positive integer). That is, the X- and Y-axes are defined in the image data 3001, and each point is indicated by X- and Y-coordinates. More specifically, the coordinates of the rectangle are defined by the X- and Y-coordinates of two diagonal vertices. An X-coordinate 3501 and a Y-coordinate 3502 are defined for the first vertex on a diagonal line. An X-coordinate 3503 and a Y-coordinate 3504 are defined for the second vertex on the same diagonal line. Note that the method of defining a region on the image data is not limited to this. For example, the region information may be defined by a circular region defined by a center point and radius.

Figure 3C:
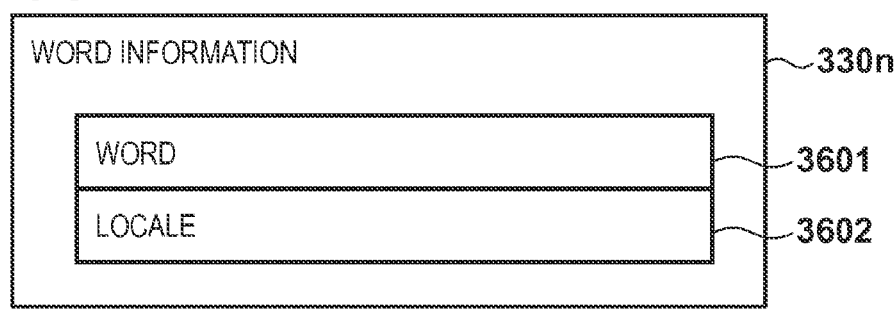

FIG. 3C shows an example of the structure of the word information. nth word information 330n (n is an arbitrary positive integer) includes a word 3601 and a locale 3602. The word 3601 indicates an object displayed (linked) in a region of the image represented by corresponding region information. The locale is the attribute of the area and language of the word 3601. For example, a locale "ja_JP" indicates Japanese used in Japan. For English, a locale "en_US" is included. Note that the locale is information generally used and a detailed description thereof will be omitted. The word information may actually include a plurality of words with different locales. In this case, information successively indicating a second word and its locale may succeed the information indicating a first word and its locale. Furthermore, region information 1 may be associated with a plurality of pieces of word information with the same meaning corresponding to respective locales. For example, "犬" in Japanese and "dog" in English which indicate the same meaning may be included for region information 1. As will be described later, word information may be interpreted.

Figure 4A:
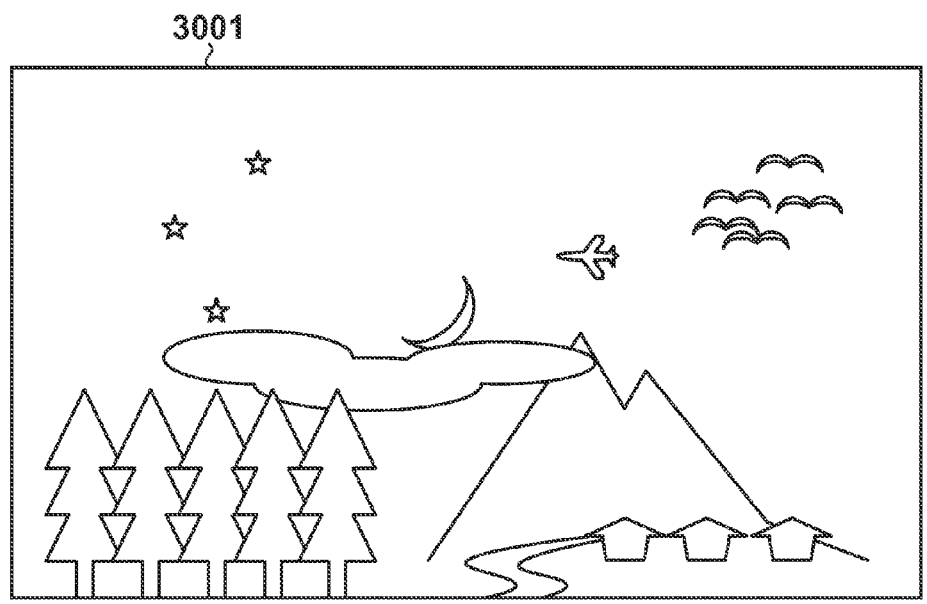
FIGS. 4A, 4B, 4C, and 4D are views each showing an example of a tagged image.
Figure 4B:
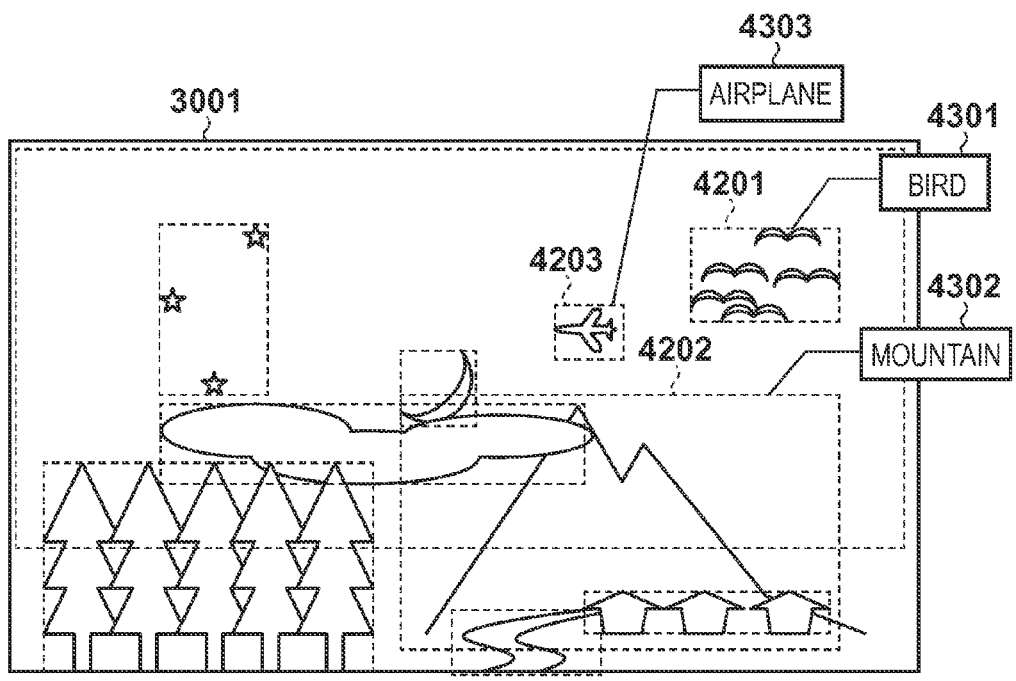
Figure 4C:
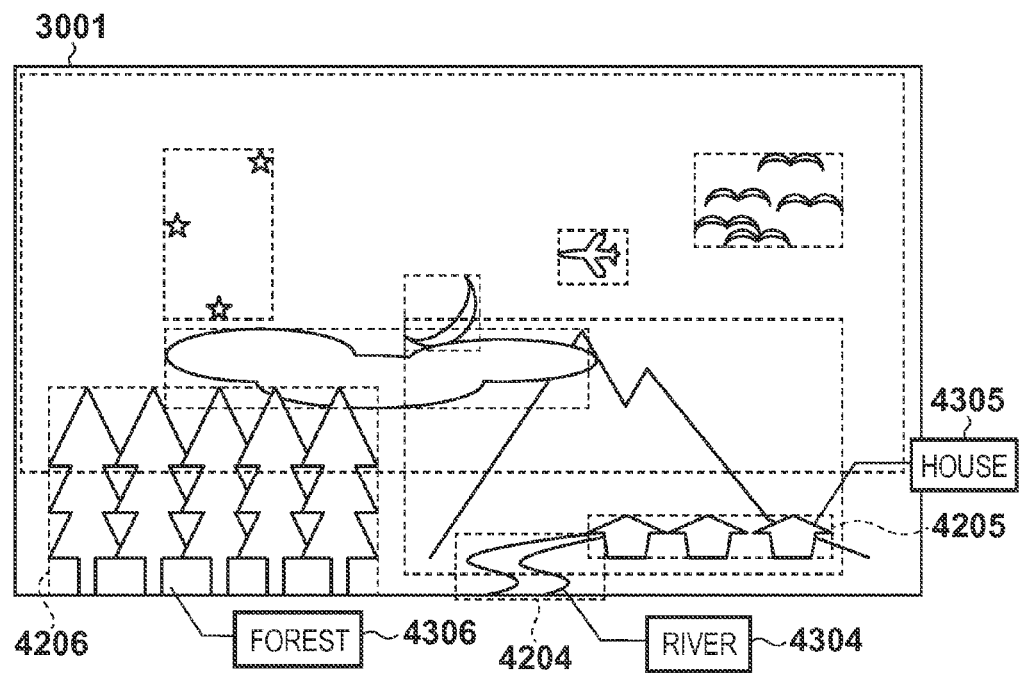
Figure 4D:
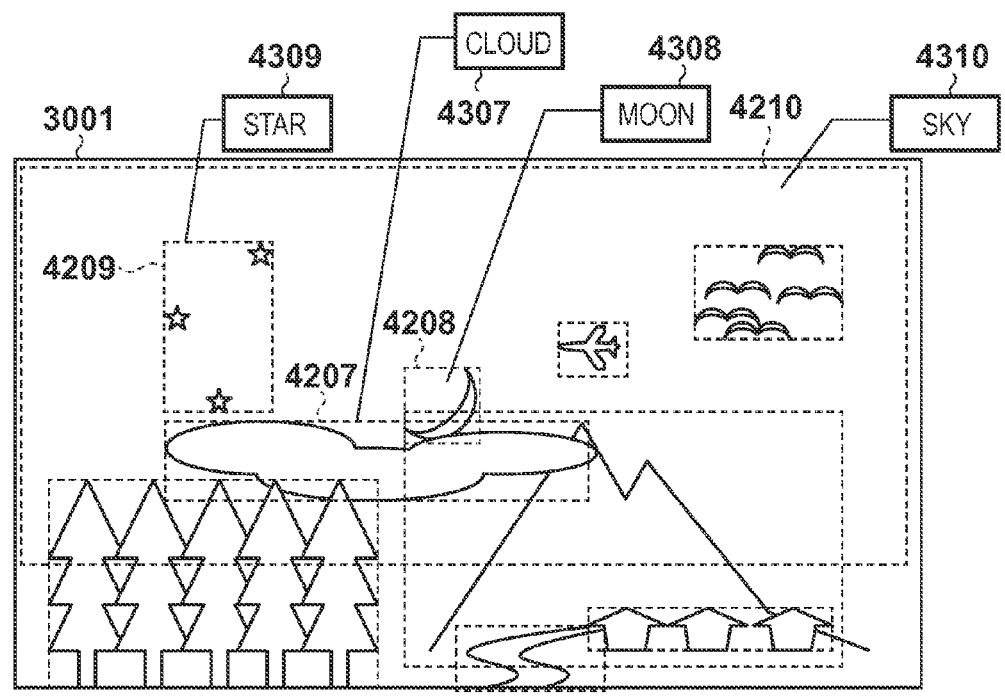

FIG. 4A shows an example of the image data 3001 associated with the tagged image data 3000 according to the embodiment. FIGS. 4B to 4D schematically show the structure of the tag data of the image data 3001 shown in FIG. 4A. In this embodiment, the tag data 1 3101 is associated with a rectangular region 4201 within the image data 3001. Since the rectangular region 4201 within the image data 3001 includes a word "bird" 4301, the tag data 1 3101 is formed by the region information 3201 representing the rectangular region 4201 and the word information 3301 representing the word "bird". As described above, the region information 3201 holds the diagonal coordinates of the rectangular region 4201. The word information 3301 holds "bird" as the word 3601. The locale 3602 of the word information 3301 holds "en_US". Note that the locales of all pieces of word information in the following description are "en_US" unless otherwise specified. The tag data 1 3101 is held in the tagged image data 3000.

Similarly, a rectangular region 4202 and a word "mountain" 4302 associated with it form the tag data 2 3102 which is held in the tagged image data 3000. The same applies to a rectangular region 4203 and a word "airplane" 4303. Similarly, a rectangular region 4204 and a word "river" 4304 shown in FIG. 4C form tag data 4 3104. A rectangular region 4205 and a word "house" 4305 form tag data 5 3105. A rectangular region 4206 and a word "forest" 4306 form tag data 6 3106.

Similarly, a rectangular region 4207 and a word "cloud" 4307 shown in FIG. 4D form tag data 7 3107, and a rectangular region 4208 and a word "moon" 4308 form tag data 8 3108. A rectangular region 4209 and a word "star" 4309 form tag data 9 3109. Furthermore, a rectangular region 4210 and a word "sky" 4310 form tag data 10 3110.

Note that the tagged image data of the present invention are characterized in that region information associated with word information may be associated with a plurality of pieces of word information. For example, the word "sky" 4310 and the word "moon" 4308 are different pieces of word information. Their rectangular regions overlap each other in the rectangular region 4208, and thus the same region information is associated with both the pieces of word information. This is effective at preventing an attack by a third party as an attacker by glancing furtively at an image selection operation.

A number of tagged image data each associated with word information for each rectangular region similarly to the above-described tagged image data 3000 are accumulated in the tagged image DB 2003.

Figure 5:
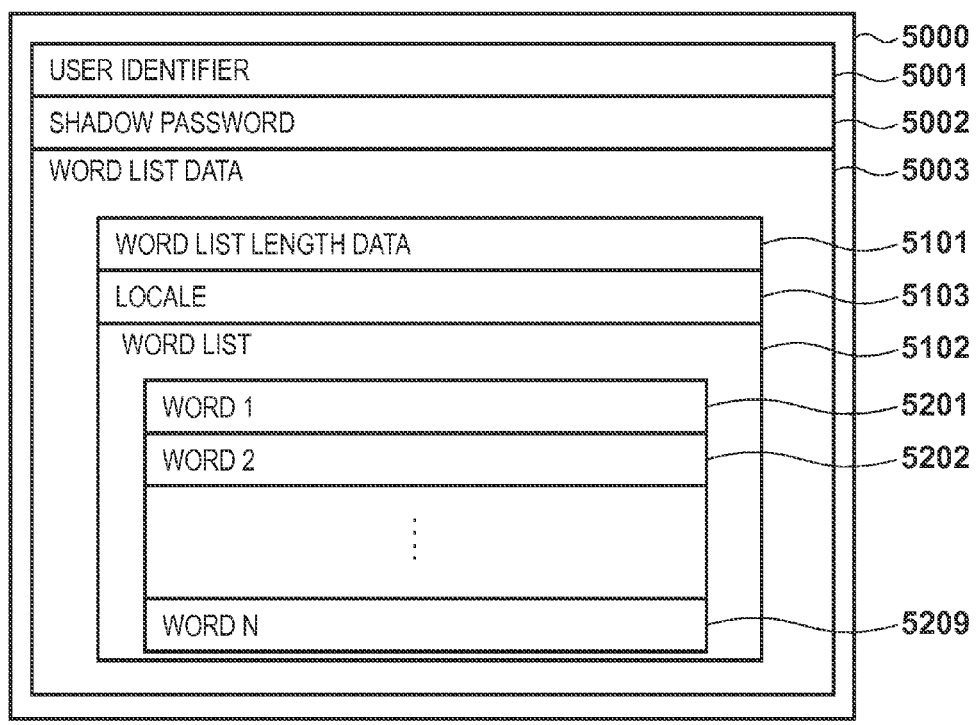
FIG. 5 is a view showing an example of the structure of a user registration information record.

The user registration information will now be described. FIG. 5 schematically shows the structure of the user registration information record stored in the user registration information DB 2005. A user registration information record 5000 indicates the entire structure of user registration information. A user identifier 5001 is identification information, of the user registration information, for identifying a user, in which a character string is designated.

A shadow password 5002 is designated to be used for alternative authentication. The alternative authentication indicates another authentication means to be used when it is difficult to perform authentication by an image according to the present invention due to a systematic factor or accessibility. Whether to prepare an alternative authentication means depends on implementation.

Word list data 5003 is used for authentication of a user for which data is stored in the user registration information record 5000. Word list length data 5101 is data of a list length indicating the total number of words contained in the word list data 5003. A word list 5102 is a list of registered words. The word list 5102 includes words 1 to N (N is an arbitrary positive integer). In this example, a word 1 5201, a word 2

5202, . . . , a word N 5209 are shown. Note that the word list length data 5101 stores the value of N. The word list 5102 includes at least one word. Note also that a word included in the word list 5102 may be added or deleted in response to a user instruction or the like.

A locale 5103 indicates the locale of the word 1 5201 to the word N 5209 included in the word list 5102. For example, the locale 5103 of the word list data 5003 of user A with the user identifier 5001 indicating "USER_A" is "en_US", and words included in the word list 5102 are "bird", "moon", and "cloud".

A word 520*n* (n is an arbitrary positive integer) included in the word list 5102 and the word 3601 forming the word information 330*n* (n is an arbitrary positive integer) are stored in a data format such that they can be compared with each other. If, for example, the word 520*n* included in the word list 5102 is "bird" and the word 3601 of the word information included in the specific tag data 310*n* is also "bird", it is determined that these two words match with each other.

In this comparison operation, it is possible to add, as the condition of matching of words, a condition that the locales 3602 and 5103 respectively accompanying the words match with each other. Alternatively, assume that the locales are different from each other and the words themselves do not match with each other. In this case, the words can be considered to match with each other when one word is automatically interpreted from its locale to the other locale and the resultant word matches with the other word. For example, a word "鳥" (Japanese) and a word "bird" (English) which indicate the same meaning may be considered as words matching with each other.

The more detailed module structure of the authentication UI 2001 will be described with reference to FIG. 2B. A user identifier input UI module 2101 is used to display a screen for inputting a user identifier, and acquire an input. A user identifier inquiry module 2102 is used to inquire the user registration information DB 2005 about a user identifier, and acquire, if the user identifier has been registered, a corresponding user registration information record 5000. An image authentication UI module 2103 is used to display the image data 3001, and acquire contents of a user instruction.

A word list data acquisition module 2104 is used to acquire the word list data 5003 included in the user registration information record 5000 which has been acquired from the user registration information DB 2005. A word list/word acquisition module 2105 is used to extract the word list 5102 from the acquired word list data 5003, and then extract words 1 to N from it.

A tagged image extraction module 2106 is used to acquire the tagged image data 3000 from the tagged image DB 2003. An image data extraction module 2107 is used to extract the image data 3001 from the acquired tagged image data 3000.

A coordinate/word collation module 2108 is used to collate coordinates instructed by the user using the image authentication UI module 2103 with a word (one of the words 5201 to 5209) extracted by the word list/word acquisition module 2105 on the tagged image data 3000. The coordinate/word collation module 2108 has a function of determining whether there is tag data (one of the tag data 3101 to 3109) attached to the tagged image data 3000 in which the acquired coordinates match with the word.

An authentication result determination module 2109 is used to hold a result of authentication by the authentication system. A dummy authentication module 2110 is used to defend, when authentication fails in the middle of processing, the user from a brute force attack by an attacker by pretending to continuously execute the authentication processing. A random image extraction module 2111 is used to randomly extract, from the tagged image DB 2003, the tagged image data 3000 to be used by the dummy authentication module 2110.

Each module of the authentication UI 2001 shown in FIGS. 2A and 2B is implemented by software which is loaded into the RAM 1302 of the information processing apparatus 1002, and executed by the CPU 1101. Note that the above-described arrangement of the authentication UI 2001 is merely an example. Other modules may be added, or some modules may be deleted or integrated, as needed.

(Screen Examples)

Figure 6A:
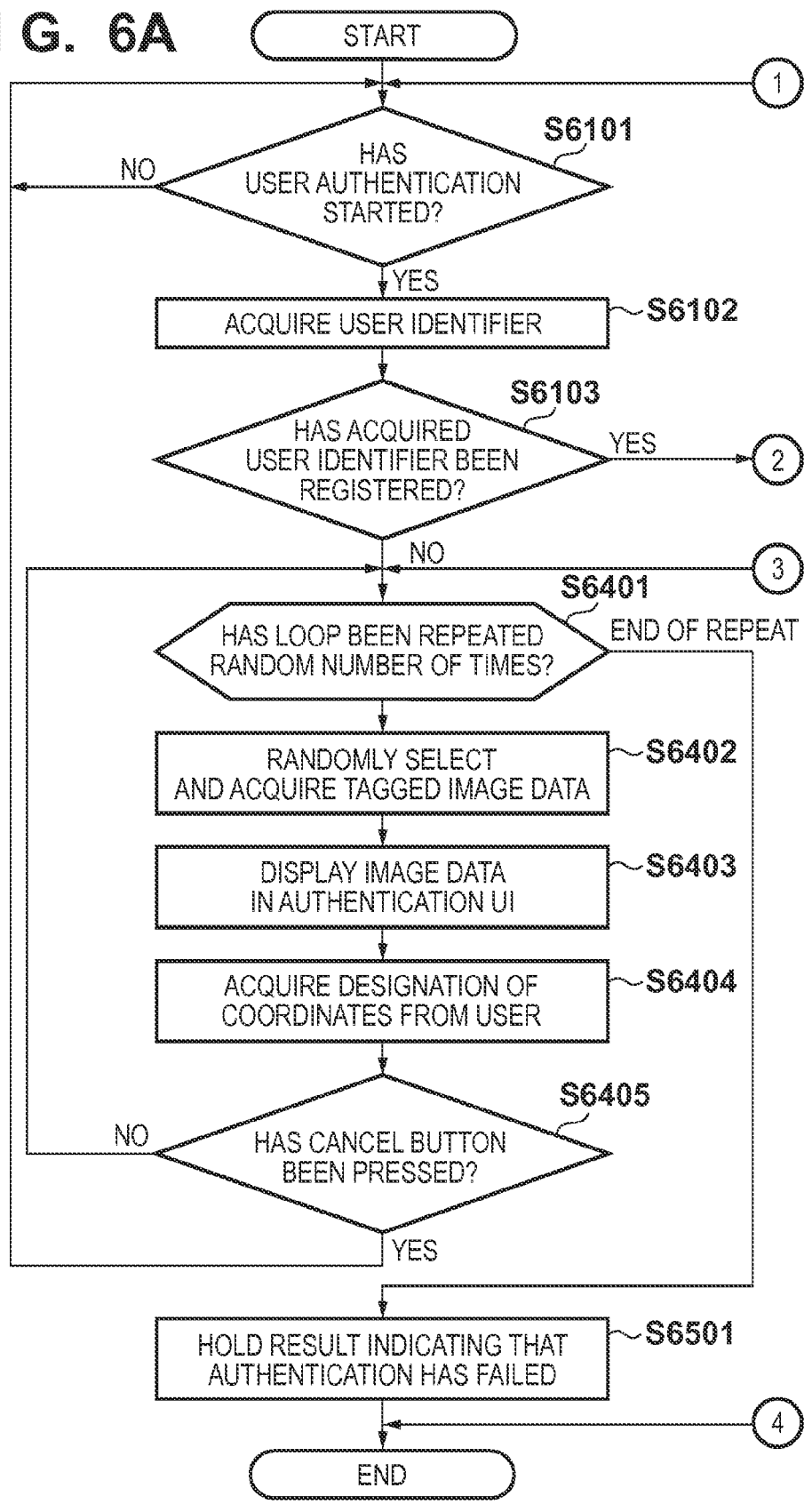
FIGS. 6A and 6B are flowcharts illustrating a processing procedure according to the first embodiment.
Figure 7A:
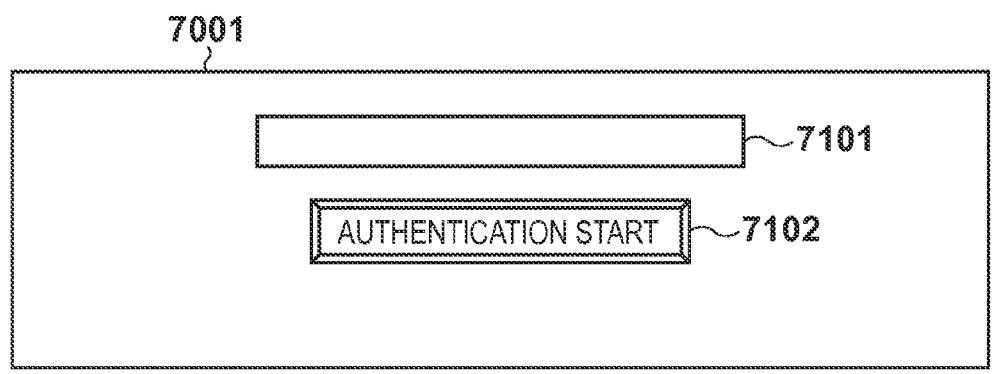
FIGS. 7A and 7B are views showing an example of an authentication user interface according to the first embodiment.
Figure 7B:
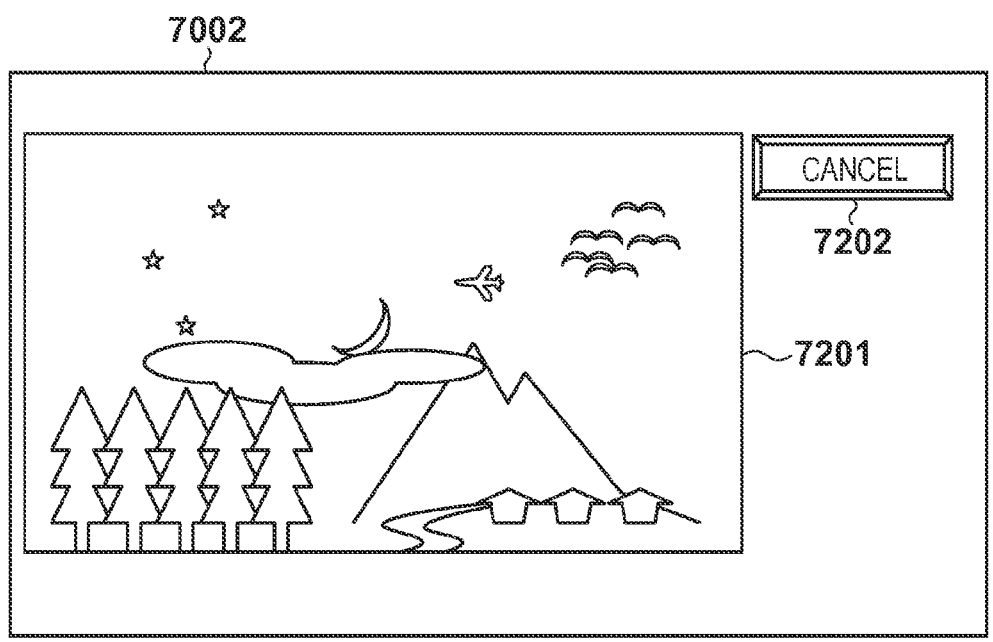

FIGS. 7A and 7B show examples of a screen arrangement provided by the authentication UI 2001. A user identifier input screen 7001 shown in FIG. 7A is displayed on the display device 1310 in step S6101 of FIG. 6A (to be described later), and used to input the user identifier of the user as an authentication processing target. The user inputs a user identifier in a user identifier input field 7101. When an authentication start button 7102 is pressed after the user inputs a user identifier in the user identifier input field 7101, start of authentication is instructed. The user identifier input screen 7001 implements an acceptance means.

An image authentication screen 7002 shown in FIG. 7B is an example of the arrangement of a screen displayed on the display device 1310 after the authentication UI 2001 acquires a user identifier in step S6102. An image display region 7201 is a display region in which the image data 3001 of the tagged image data 3000 for authentication is displayed. A cancel button 7202 is used to stop authentication, and return to the user identifier input screen 7001.

[Processing Procedure]

Figure 6B:
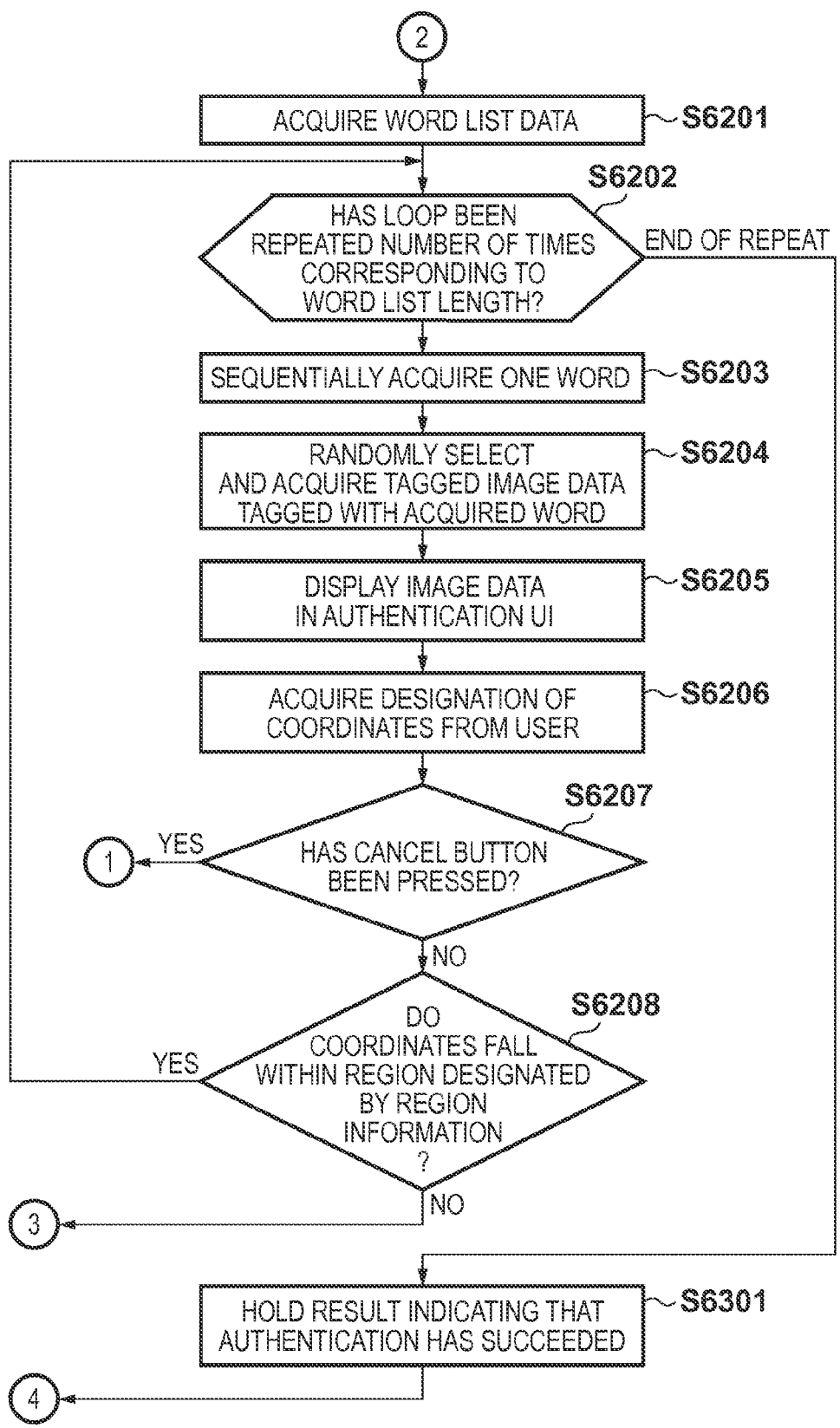

An overview of the overall operation of the authentication system according to the first embodiment of the present invention will be described with reference to FIGS. 6A and 6B. As described above, various processes according to the present invention are implemented by loading programs stored in the secondary storage device 1304 as a storage unit or the like into the RAM 1302, and executing them by the CPU 1101.

Upon start of processing, the user identifier input UI module 2101 of the authentication UI 2001 displays the user identifier input screen 7001 on the display device 1310. In step S6101, the user identifier input UI module 2101 determines whether the user has instructed to start user authentication. If the user has not instructed to start authentication (NO in step S6101), the process returns to step S6101 to wait for acceptance of an instruction to start authentication. If the user has instructed to start authentication (YES in step S6101), the process advances to step S6102.

In step S6102, the user identifier input UI module 2101 acquires a user identifier input by the user, and transfers it to the user identifier inquiry module 2102. After that, the image authentication UI module 2103 of the authentication UI 2001 displays the image authentication screen 7002 on the display device 1310.

In step S6103, the user identifier inquiry module 2102 inquires whether the user identifier acquired in step S6102 has been registered in the user registration information DB 2005. If the acquired user identifier has been registered (YES in step S6103), the process advances to step S6201; otherwise (NO in step S6103), the process advances to step S6401.

In step S6201, the word list data acquisition module 2104 acquires the user information record of the user registered by the input user identifier from the user registration information DB 2005, and then acquires the word list data 5003 from the record.

In step S6202, the word list data acquisition module 2104 enters a loop which is repeated the number of times corresponding to the word list length data 5101 extracted from the word list data 5003. The number of times the loop is repeated is determined. If the loop has not been repeated the predetermined number of times, the process advances to step S6203; otherwise, the process advances to step S6301.

In step S6203, the word list/word acquisition module 2105 acquires one word from the word list 5102 included in the word list data 5003 every time the loop is executed. If, for example, the loop is executed for the first time, the word list/word acquisition module 2105 acquires the word 1 5201. The word list/word acquisition module 2105 may acquire the words from the first one in the word list, or another acquisition order known to the user may be adopted. That is, defining a word acquisition order according to a predetermined rule enables to arbitrarily change an authentication order for the plurality of words. Assume that in this embodiment, the words are sequentially acquired from word 1, and images corresponding to the words are sequentially displayed. Assume also that in this embodiment, the user knows the order in which words to be designated are displayed.

In step S6204, the tagged image extraction module 2106 searches the tagged image DB 2003 for tagged image data 3000 which holds tag data 310n including the word acquired in step S6203. If only one appropriate tagged image data 3000 is found, the tagged image extraction module 2106 acquires it. If a plurality of appropriate tagged image data 3000 have been registered, the tagged image extraction module 2106 randomly selects and acquires one of them.

In step S6205, the image data extraction module 2107 extracts the image data 3001 of the tagged image data 3000 selected and acquired in step S6204, and transfers it to the image authentication UI module 2103. The image authentication UI module 2103 displays the received image data 3001 in the image display region 7201 of the image authentication screen 7002. In step S6206, the image authentication UI module 2103 waits for an instruction from the user. The user designates any coordinates within the image display region 7201 using the pointing device 1307 or the like, or presses the cancel button 7202 to instruct cancellation. If the user gives some instruction, the image authentication UI module 2103 acquires the information of the designated coordinates or a cancel button pressing instruction. If the user has instructed cancellation (YES in step S6207), the process returns to step S6101. On the other hand, if the user has designated coordinates (NO in step S6207), the process advances to step S6208.

In step S6208, the image authentication UI module 2103 transfers the coordinates designated by the user to the coordinate/word collation module 2108. The coordinate/word collation module 2108 determines whether the designated coordinates fall within a rectangular region defined by the region information of tag data including the word acquired in step S6203. Assume, for example, that the region information forming the tag data including the acquired word information defines a rectangular region (100, 100)-(200, 200). If the coordinates designated by the user are (150, 150), it is determined that they fall within the rectangular region indicated by the region information. This indicates that the user could correctly designate a position, on the image, corresponding to the word which should be designated for authentication.

On the other hand, for example, if the coordinates designated by the user are (250, 250), they are determined to fall outside the region, which indicates that the user could not correctly designate a position, on the image, corresponding to the word which should be designated for authentication.

If the user has correctly designated the position, on the image, corresponding to the word which should be designated (YES in step S6208), the process returns to step S6202, and continues the processing procedure. Alternatively, if the user has not correctly designated the position corresponding to the word on the image (NO in step S6208), the process advances to step S6401.

If the loop has been executed the predetermined number of times in step S6202, the process advances to step S6301 (step S6202→step S6301), and the authentication result determination module 2109 holds a result indicating that authentication has succeeded. After that, the processing procedure ends.

If the user identifier has not been registered in the user registration information DB 2005 (NO in step S6103), or the coordinates fall outside the rectangular region of the region information (NO in step S6208), the process advances to step S6401.

In step S6401, the dummy authentication module 2110 randomly determines the number of times a loop is repeated, and repeats processing in steps S6402 to S6405 the number of times. If the loop has not been executed the number of times, the process advances to step S6402; otherwise, the process advances to step S6501.

In step S6402, the random image extraction module 2111 randomly acquires one tagged image data 3000 from the tagged image DB 2003. In step S6403, the random image extraction module 2111 extracts image data 3001 from the acquired tagged image data 3000, and transfers it to the image authentication UI module 2103. The image authentication UI module 2103 displays the received image data 3001 in the image display region 7201 of the image authentication screen 7002.

Note that the number of times determined in step S6401 is random in this embodiment. The present invention, however, is not limited to this, and the number of times the loop is repeated may be determined in advance.

Note that in consideration of a case in which the user is actually an attacker, the loop is repeated a given number of times (a random number of times in this example) in the above-described processing procedure when the user could not correctly input a user identifier or could not correctly select the word which should be selected.

That is, if an attacker can immediately identify whether a user identifier input by himself/herself is correct or whether designated coordinates select a correct word, he/she can immediately move on to a next try. This increases the probability that a brute force attack succeeds. To prevent this, even after user authentication fails, a given number of dummy authentication images are randomly displayed. Unless the user gives an instruction (in this example, the user presses the cancel button), he/she cannot recognize whether authentication has finally succeeded or failed.

In step S6404, the image authentication UI module 2103 waits for the user to designate any coordinates within the image display region 7201 using the pointing device 1307 or to instruct cancellation by pressing the cancel button 7202. The image authentication UI module 2103 acquires the coordinates designated by the user or a cancel button pressing instruction.

If the user has instructed cancellation (YES in step S6405), the process returns to step S6101, and continues the processing in step S6101 and subsequent steps. If the coordinates have been designated (NO in step S6405), the process returns to step S6401, and continues the processing in step S6401 and subsequent steps.

If the loop has been executed the number of times determined in step S6401, the process advances to step S6501 (step S6401→step S6501), and the authentication result determination module 2109 holds a result indicating that authentication has failed. After that, the processing procedure ends.

The above description assumes that the user inputs a user identifier to the user identifier input screen 7001 using the keyboard 1306. The user may perform an input operation for a virtual keyboard displayed on the display device 1310 using the pointing device 1307. Alternatively, another means may be used.

(Other Display Screen Examples)

FIG. 9 shows another example of the arrangement of the user identifier input screen 7001. An icon 9101 is an icon (button) which is pressed by the user to designate a user identifier "USER Alpha". An icon 9102 is an icon (button) which is pressed by the user to designate a user identifier "USER Beta". An icon 9103 is an icon (button) which is pressed by the user to designate a user identifier "USER Gamma".

The user can press one of the icons 9101, 9102, and 9103 using the pointing device 1307 to designate his/her user identifier, instead of inputting the user identifier using the keyboard 1306.

Figure 8A:
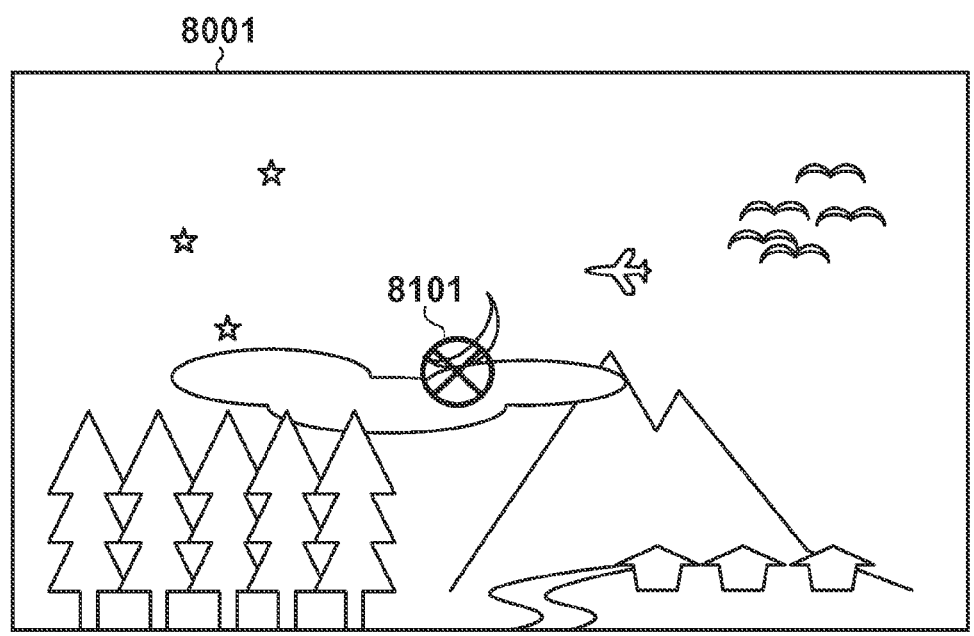
FIGS. 8A and 8B are views for explaining association between instructed coordinates and a word in two images according to the first to fourth embodiments.
Figure 8B:
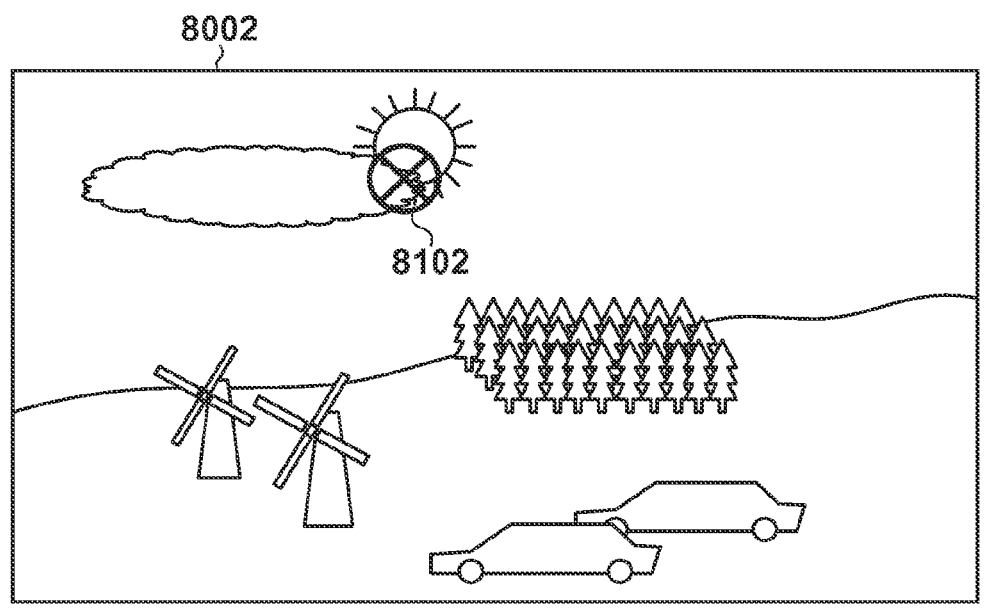

A further description will be provided with reference to FIGS. 8A and 8B. Assume that a word in the word list 5102 to be designated by the user is "sky". In an image 8001 shown in FIG. 8A, the user is aware of the word "sky", and designates coordinates 8101 using the pointing device 1307. In this case, among tag data associated with tagged image data, three tag data, that is, tag data including a word "sky", that including a word "cloud", and that including a word "moon" include region information (rectangular regions) including the coordinates 8101.

The system has information indicating that the word which the user intends to designate is "sky" based on the user registration information DB 2005, and acquires and detects that the user has designated the coordinates 8101 or 8102 within the image region where "sky" exists. Based on this, the system can determine that the user correctly knows the word which should be designated.

On the other hand, assume that an attacker can glance furtively at such a designation operation using the pointing device 1307, for example, from behind of the user. In this case, the attacker cannot theoretically identify whether the selected word is "cloud" or "sky". This is because the word designated by the user by designating the coordinates 8101 in the image 8001 may be "sky", "cloud", or "noon". The attacker who has glanced furtively at the operation once cannot identify which word has been designated.

As the number of tag data corresponding to a pair of coordinates is larger, it is more difficult for an attacker to estimate a word as part of secret information for authentication. It is apparent from this that as the number of tag data embedded in one image is larger, it is more difficult for an attacker to specify a word designated by the user.

In the present invention, if the same user tries to perform authentication at another time, for example, a completely different image like an image 8002 shown in FIG. 8B is presented instead of the image 8001. If the image 8002 is presented, the user designates, for example, the coordinates 8102 as coordinates corresponding to the word "sky" using the pointing device 1307 or the like. Among tag data associated with tagged image data including the image 8002, three tag data, that is, tag data including a word "sky", that including a word "cloud", and that including a word "sun" include the coordinates 8102. Even in this case, since the user knows that the word to be designated is "sky", he/she can correctly read the contents of the image, thereby performing authentication by, for example, designating the coordinates 8102.

Changing the image to a different one and displaying it every time disables an attacker to make an attack by simply remembering coordinates which have been designated by the user last time. This is because if the attacker has only the information of the coordinates 8101 which have been designated by the user last time, authentication fails when designating the coordinates 8101 in the image 8002.

As described above, coordinates for designating an appropriate word change depending on presented image data. As a result, in the present invention, an attacker cannot spoof the user to make authentication succeed by glancing furtively at coordinates designated by the user or performing wiretapping.

As described above, even if a word to be designated is the same, it is possible to present different image data every time. As a result, an attacker cannot estimate secret information based on a specific image repeatedly appearing, and thus cannot make an intersection attack.

The images 8001 and 8002 shown in FIGS. 8A and 8B are stored in the tagged image DB 2003 in advance, and are not specifically limited to images prepared by the user. This disables an attacker to make an educated-guess attack.

It is possible to make full use of the above-described characteristics of the present invention even if only one word is stored in the word list 5102. It is, however, possible to provide a higher level of security when a plurality of words are stored in the word list 5102 and presenting the image data 3001 by the system and designating coordinates by the user are repeated the number of times equal to the number of words. On the other hand, even if the number of words increases, the user can readily remember the words, because these words are simple ones such as "sky", "moon", and "cloud". More specific words may be used, as a matter of course.

According to the first embodiment of the present invention, it is possible to create an authentication system which can be securely used by the user by only storing, as secret information, a word list including simple words such as "sky", "moon", and "cloud".

An authentication system created according to the first embodiment of the present invention can resist an intersection attack and educated-guess attack. In addition, the system created according to the embodiment does not leak word information as secret information used for authentication even if a third party glances furtively at the user operation of the authentication UI 2001.

<Second Embodiment>

The second embodiment of the present invention will be described with reference to the accompanying drawings. Note that a description of parts common to the first embodiment will be omitted.

[System Arrangement]

FIG. 10A is a block diagram showing an example of a system arrangement according to the second embodiment of the present invention. In this embodiment, a user terminal 10002 and a server 10003 are communicably connected with each other via a network 10001. The user terminal 10002 is an information processing terminal used by the user. The server 10003 is accessed by the user terminal 10002, and provides an authentication service according to the present invention.

In this embodiment, a server for providing a service to be used by the user and a server for providing an authentication service can be separately provided. FIG. 10B shows an example of the arrangement. An authentication server 10004 provides an authentication service according to the present invention. A service providing server 10005 provides an arbitrary service requested by the user. The service provided by the service providing server 10005 may be any service, and is not specifically limited.

Furthermore, in this embodiment, an arrangement is possible in which some functions necessary for authentication according to the present invention are provided on another server. FIG. 10C shows an example of the arrangement. A private network 10006 is a network to which a system including the authentication server 10004 is connected. A user registration information server 10007 is a server on which a user registration information DB operates. A tagged image server 10008 is a server on which a tagged image DB operates. Note that the network 10001 and private network 10006 are segmented. This prevents communication between the authentication server 10004 and the user registration information server 10007 or tagged image server 10008 from flowing to the network 10001.

The following description will be provided based on the arrangement shown in FIG. 10C. Even if, however, all providing functions are integrated into one server as shown in FIG. 10A, the similar arrangement is applicable, as a matter of course.

[Sequence in System]

Figure 11B:
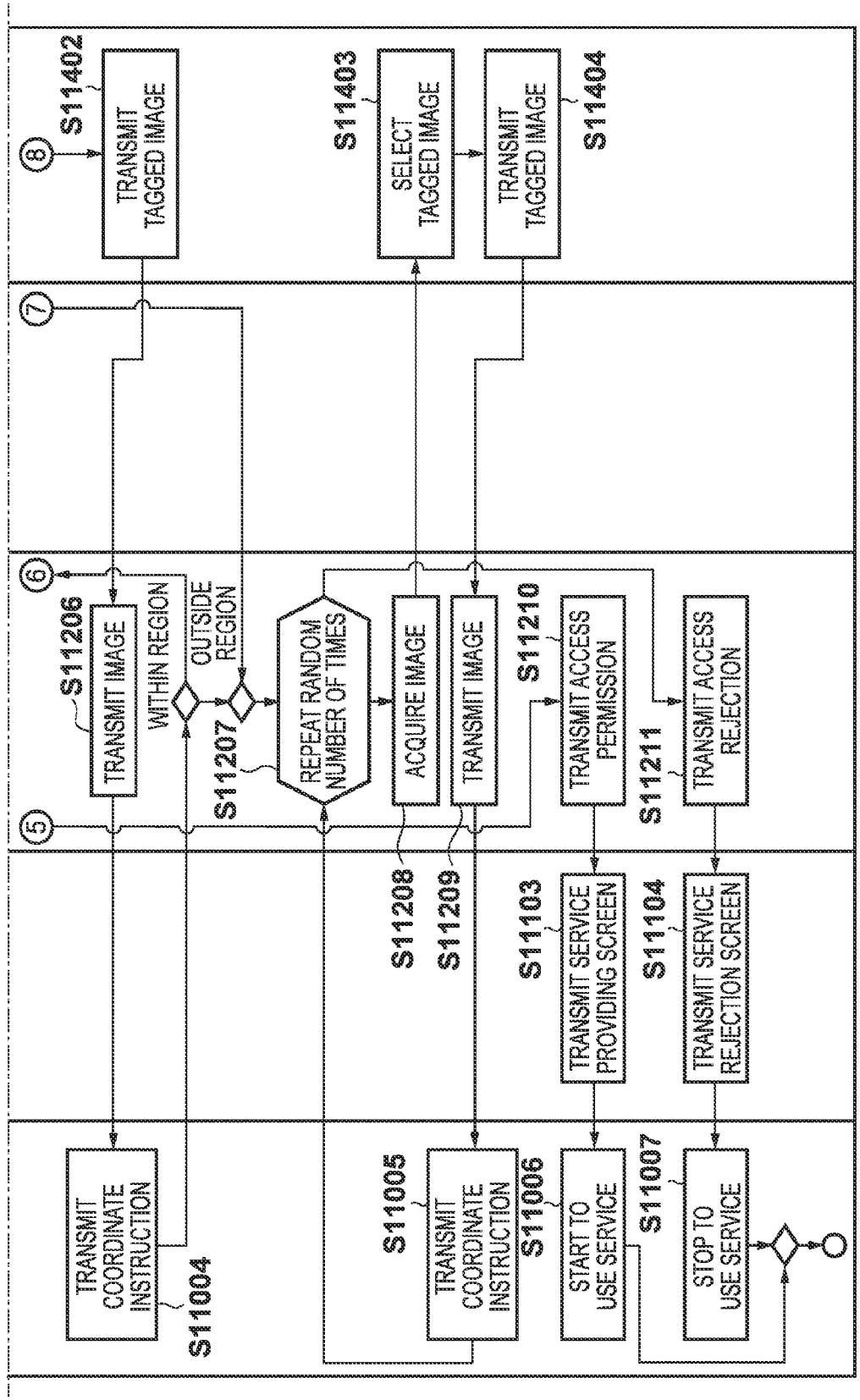

The operation of the system according to the embodiment will be described with reference to FIGS. 11A and 11B. If the user tries to access a service provided by the service providing server 10005 from the user terminal 10002, the user terminal 10002 executes service access in S11001. The user terminal 10002 then transmits a request to the service providing server 10005.

Figure 12A:
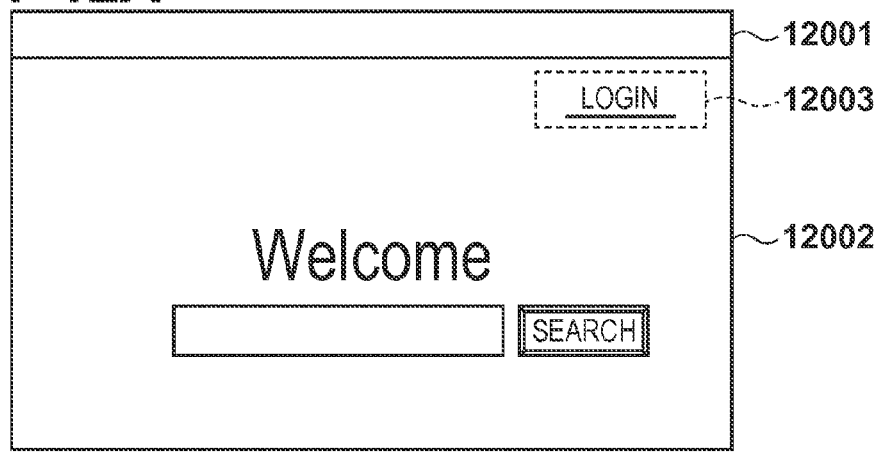
FIGS. 12A, 12B, and 12C are views showing an example of an authentication user interface according to the second to fourth embodiments.

In S11101, the service providing server 10005 transmits a service start screen to the user terminal 10002. FIG. 12A shows an example of the service start screen. A window 12001 is the window of an application for accessing the service. The window 12001 displays a service start screen 12002 and a login link 12003. The login link 12003 is a link for requesting a login screen to log in to the service.

In S11002, the user terminal 10002 displays the service start screen 12002 transmitted by the service providing server 10005. Since the user needs to perform a login operation, he/she clicks on the login link 12003 to request a login screen. This operation causes the user terminal 10002 to transmit a login request to the service providing server 10005.

In S11102, the service providing server 10005 transmits an authentication screen request to the authentication server 10004 in response to the login request.

Figure 12B:
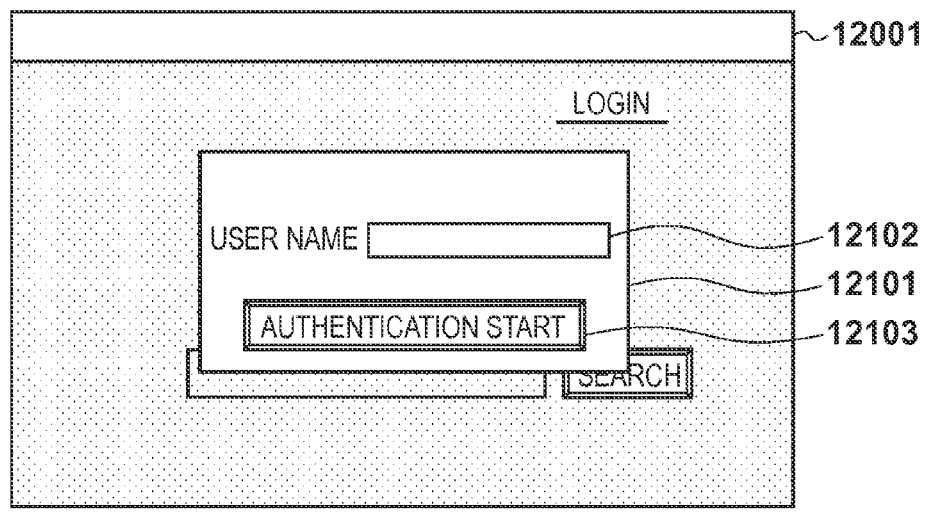

In S11201, the authentication server 10004 transmits an authentication screen to the user terminal 10002 to display it. FIG. 12B schematically shows the authentication screen transmitted by the authentication server 10004. The window 12001 displays an authentication screen 12101, a user identifier input field 12102, and an authentication start button 12103. The authentication start button 12103 is used to transmit a user identifier to the authentication server 10004.

In S11003, the user terminal 10002 displays the authentication screen 12101 sent by the authentication server 10004. The user inputs a user identifier in the user identifier input field 12102 on the authentication screen 12101, and presses the authentication start button 12103, thereby transmitting the user identifier to the authentication server 10004. This operation causes the user terminal 10002 to transmit the user identifier to the authentication server 10004.

In S11202, the authentication server 10004 transmits the user identifier received from the user terminal 10002 to the user registration information server 10007, and requests to return a corresponding user registration information record 5000.

Upon receiving the request from the authentication server 10004, the user registration information server 10007 searches for the user registration information record 5000 in S11301. If there is no corresponding user information, the user registration information server 10007 transmits, to the authentication server 10004, information indicating that there is no corresponding user information. The process then advances to S11207.

If there is corresponding user information, the process advances to S11302. In S11302, the user registration information server 10007 extracts the user registration information record 5000, and transmits it to the authentication server 10004.

In S11203, the authentication server 10004 extracts the word list data 5003 from the received user registration information record 5000. In S11204, the authentication server 10004 executes a loop the number of times corresponding to the word list length of the word list data 5003. If the loop has not been executed the predetermined number of times, the process advances to S11205; otherwise, the process advances to S11210.

In S11205, the authentication server 10004 transmits a word $520n$ (n is a positive integer) extracted from the word list to the tagged image server 10008.

In S11401, the tagged image server 10008 selects arbitrary one of tagged image data 3000 such that the received word $520n$ matches word information $330n$ of tag data $310n$. In S11402, the tagged image server 10008 transmits the selected tagged image data 3000 to the authentication server 10004.

Figure 12C:
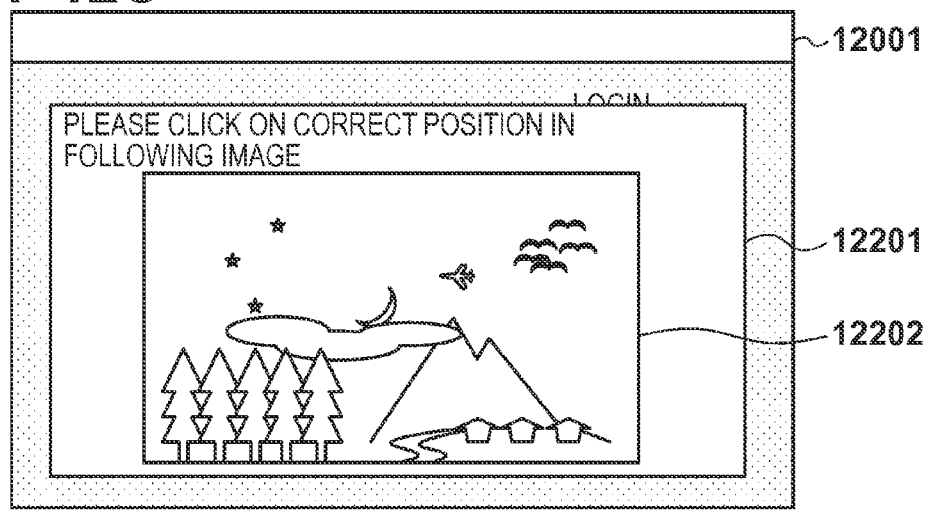

In S11206, the authentication server 10004 extracts the image data 3001 included in the tagged image data 3000 acquired from the tagged image server 10008, and transmits it to the user terminal 10002. FIG. 12C schematically shows an authentication image display screen displayed in the user terminal 10002. The window 12001 displays an authentication image display screen 12201 and an authentication image display region 12202.

In S11004, the user terminal 10002 acquires the image data 3001 from the authentication server 10004, and displays it in the authentication image display region 12202. The user terminal 10002 accepts designation of coordinates from the user. If the user designates coordinates, the user terminal 10002 transmits the designated coordinates to the authentication server 10004. At this time, the user terminal 10002 may transmit only position information of the image designated by the user. Therefore, even if, for example, an attacker acquires the transmitted information, he/she cannot identify the position of a specific image or a word corresponding to an object included in a specific region.

The word information $330n$ of the tag data $310n$ included in the tagged image data 3000 matches the word transmitted in S11205. If the words match each other, the authentication server 10004 refers to region information $320n$ of the tag data $310n$, and determines whether the coordinates transmitted by the user terminal 10002 in S11004 fall within a region indicated by the region information $320n$. If the designated coordinates fall within the region, the process returns to S11204 to continue the loop; otherwise, the process advances to S11207.

If the loop has been executed the predetermined number of times in S11204, the process advances to S11210. Since it has been confirmed for all the words that the designated coordinates fall within the region, the authentication server 10004 allows access. The authentication server 10004 transmits access permission information to the service providing server 10005.

After the authentication server 10004 allows access, the service providing server 10005 transmits an arbitrary service providing screen (not shown) to the user terminal 10002 in S11103.

In S11006, the user terminal 10002 displays the service providing screen (not shown) received from the service providing server 10005, thereby enabling the user to use the desired service. The processing of the authentication system is then completed, and the user can use the service provided by the service providing server 10005.

If the coordinates transmitted in S11004 fall outside the rectangular region, the process advances to S11207. Furthermore, if, the user registration information server 10007 cannot find information in S11301 as a result of searching for information using the user identifier, the process also advances to S11207.

In S11207, the authentication server 10004 executes the loop. The number of times the loop is repeated is randomly determined when entering the loop. The loop has not been repeated the determined number of times, the process advances to S11208; otherwise, the process advances to S11211.

In S11208, the authentication server 10004 requests the tagged image data 3000 of the tagged image server 10008 without especially designating any word. In S11403, the tagged image server 10008 randomly selects the tagged image data 3000. In S11404, the tagged image server 10008 transmits the selected tagged image data 3000 to the authentication server 10004.

In S11209, the authentication server 10004 transmits, to the user terminal 10002, the image data 3001 included in the tagged image data 3000 received from the tagged image server 10008.

In S11005, the user terminal 10002 displays the image data 3001 received from the authentication server 10004 in the authentication image display region 12202, and accepts designation of coordinates from the user. When the user designates coordinates, the user terminal 10002 transmits the designated coordinates to the authentication server 10004.

The authentication server 10004 discards the information of the coordinates transmitted by the user terminal 10002, and returns the process to S11207 to continue the loop.

If the authentication server 10004 has executed the loop the predetermined number of times in S11207, the process advances to S11211.

In S11211, the authentication server 10004 transmits, to the service providing server 10005, access rejection information (not shown) indicating that access is not allowable.

In S11104, based on the access rejection information received from the authentication server 10004, the service providing server 10005 transmits a service rejection screen to the user terminal 10002.

In S11007, the user terminal 10002 displays the service rejection screen received from the service providing server 10005, and makes the user stop using the service. The processing of the authentication system is then completed, and the user cannot use the desired service provided by the service providing server 10005.

As described above, according to this embodiment, it is possible to use the authentication system similar to that in the first embodiment between services on the network. To use a service provided by the service providing server 10005 via the user terminal 10002, the user can execute authentication using the authentication service provided by the authentication server 10004. The service providing server 10005 can thus correctly determine based on the authentication result of the authentication server 10004 whether to provide the service to the user.

According to the second embodiment of the present invention, therefore, it is possible to use the authentication system on the network.

<Third Embodiment>

The third embodiment of the present invention will be described with reference to the accompanying drawings. Note that a description of parts common to the above-described embodiments will be omitted. More specifically, in this embodiment, the internal arrangement of an information processing apparatus on which an authentication system operates, tagged image data, a user registration information record, and a user identifier input screen in an authentication UI are similar to those shown in FIGS. 1, 3A to 3C, 4A to 4D, 5, 7A, and 7B.

FIG. 13 schematically shows an image authentication screen in an authentication UI 2001 of the authentication system according to the embodiment. An image authentication screen 13002 shown in FIG. 13 includes a skip button 13201, an authentication completion button 13202, an image display region 7201, and a cancel button 7202. The skip button 13201 is used by the user to instruct a skip operation. The authentication completion button 13202 is used by the user to instruct input completion for authentication.

Figure 17:
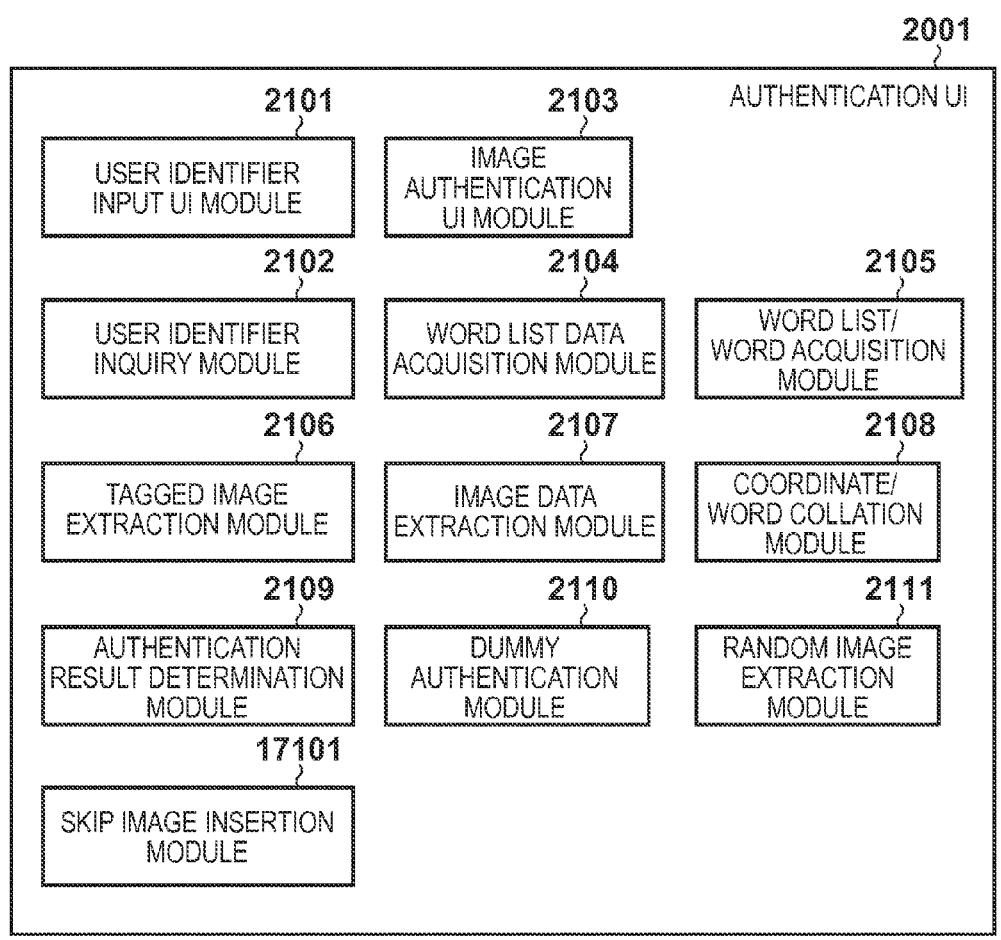
FIG. 17 is a block diagram showing an example of a software module arrangement according to the third embodiment.

FIG. 17 schematically shows the module arrangement of the authentication system according to the embodiment. Only different points from FIG. 2B will be described. A skip image insertion module 17101 is a module for determining which of an authentication image and skip image is presented in executing a loop for presenting image data 3001 in the image display region 7201.

Note that the authentication image indicates image data 3001 extracted from tagged image data 3000 associated with one of words included in a word list 5102 included in a user registration information record 5000 of the user for which authentication is currently performed. On the other hand, the skip image indicates image data 3001 extracted from tagged image data 3000 which includes no tag data corresponding to the words included in the user registration information record 5000 of the user and has been arbitrarily acquired. In the embodiment, an arrangement is added in which while authentication images are sequentially presented, a skip image is presented at an arbitrary timing, and the user instructs a skip operation for the skip image using the skip button 13201, which will be described in detail later. With the skip operation, an image currently displayed in the authentication screen is skipped to display a next image.

[Processing Procedure]

The overall operation of the authentication system according to the embodiment will be described with reference to FIG. 14. Only different points from FIGS. 6A and 6B will be explained in detail.

In step S14201, a word list/word acquisition module 2105 repeats a loop without any condition. Upon entering the loop, the process advances to step S14202. In step S14202, the word list/word acquisition module 2105 determines whether an unprocessed word remains in word list data 5003 acquired in step S6201. If an unprocessed word remains (YES in step S14202), the process advances to step S6203; otherwise (NO in step S14202), the process advances to step S14602.

In step S6203, the word list/word acquisition module 2105 acquires one word, and then the process advances to step S14601.

In step S14601, the skip image insertion module 17101 determines whether to generate a skip image. Note that a skip image is preferably generated once per several times or ten-odd times. For example, the skip image insertion module 17101 generates a random number for the determination processing. Only if the generated random number is smaller than a predetermined value, it may be determined to generate a kip image. The random number used here may be a random number provided in the system if it is sufficiently impossible to predict the random number, or a random number obtained based on a time or a physical event such as decay of a radioactive element.

If it is determined to generate a skip image (YES in step S14601), the process advances to step S14602; otherwise (NO in step S14601), the process advances to step S6204.

In step S14602, a random image extraction module 2111 acquires arbitrary tagged image data 3000 without tag data corresponding to the word from a tagged image DB 2003. In step S14603, an image authentication UI module 2103 displays the image data 3001 of the acquired tagged image data 3000 in the image display region 7201 of the image authentication screen 13002.

In step S14604, the image authentication UI module 2103 waits for the user to designate any coordinates within the image display region 7201 using a pointing device 1307, or to give an instruction by pressing one button. The button indicates the skip button 13201, authentication completion button 13202, or cancel button 7202. When the skip button 13201 is pressed, a skip operation is instructed. When the authentication completion button 13202 is pressed, authentication completion is instructed. When the cancel button 7202 is pressed, cancellation is instructed.

In step S14605, the image authentication UI module 2103 determines whether the user has pressed the skip button 13201 to instruct a skip operation. If a skip operation has been instructed (YES in step S14605), the process advances to step S6204; otherwise (NO in step S14605), the process advances to step S14606.

In step S14606, the image authentication UI module 2103 determines whether the user has pressed the cancel button 7202 to instruct cancellation. If cancellation has been instructed (YES in step S14606), the process returns to step S6002, and continues the processing procedure; otherwise (NO in step S14606), the process advances to step S14607.

In step S14607, the image authentication UI module 2103 determines whether the user has pressed the authentication completion button 13202 to instruct authentication completion. If authentication completion has been instructed (YES in step S14607), the process advances to step S14608. On the other hand, if authentication completion has not been instructed (NO in step S14607), authentication fails since, in this case, the user designates any coordinates within the image while looking at the skip image presented in the image display region 7201. In this case, the process advances to step S6501.

In step S14608, an authentication result determination module 2109 determines whether designation of coordinates and collation of the coordinates with a region designated by region information are complete for all the words included in the word list data 5003. If it has been confirmed for all the words that the coordinates designated by the user when a corresponding image is presented fall within a corresponding region (YES in step S14608), it is determined that user authentication is complete, and the process advances to step S6301. If the user presses the authentication completion button 13202 to instruct authentication completion although authentication is not complete (NO in step S14608), the user cannot be correctly authenticated, and the process advances to step S6501.

If it is determined in step S14601 not to generate a skip image (NO in step S14601), the process advances to step S6204. The process progresses, and in step S6206, the image authentication UI module 2103 waits for the user to designate any coordinates within the image display region 7201 using the pointing device, or to give an instruction by pressing one button.

In step S14203, the image authentication UI module 2103 determines whether the user has pressed the skip button 13201 to instruct a skip operation. If a skip operation has been instructed (YES in step S14203), the process returns to step S6204, and continues the processing procedure. In this case, the user could not find out a target word from the image displayed in the image display region 7201 in step S6205, or may simply have instructed a skip operation to confuse an attacker. In either case, the tagged image extraction module extracts an image from new tagged image data corresponding to the current word in step S6204, and continues the authentication processing.

If the user has not pressed the skip button 13201 in step S14203 (NO in step S14203), the process advances to step S6207. If the user has not pressed the cancel button 7202 in step S6207 (NO in step S6207), the process advances to step S14204.

In step S14204, the authentication result determination module 2109 determines whether the user has pressed the authentication completion button 13202 to instruct authentication completion. If authentication completion has not been instructed (NO in step S14204), the process advances to step S6208; otherwise (YES in step S14204), the user has instructed authentication completion without selecting any coordinates although the image displayed in the image display region 7201 corresponds to the currently acquired word. This indicates that user authentication has failed. In this case, the process advances to step S6501.

If there is no entry corresponding to the acquired user identifier in the user registration information DB 2005 in step S6103, or the user has selected coordinates outside the region in step S6208, the process advances to step S14401. Furthermore, if the user clicks on any coordinates in step S14607 although a skip image is presented, the process also advances to step S14401.

In step S14401, a dummy authentication module 2110 repeats the loop without any condition. When entering the loop, the process advances to step S6402.

In step S6404, the image authentication UI module 2103 waits for the user to designate any coordinates within the image display region 7201 using the pointing device 1307, or to give an instruction by pressing one button.

In step S14402, the image authentication UI module 2103 determines whether the user has pressed the skip button 13201 to instruct a skip operation. If no skip operation has been instructed (NO in step S14402), the process advances to step S6405; otherwise (YES in step S14402), the process returns to step S14401, and continues the processing procedure.

In step S14403, the image authentication UI module 2103 determines whether the user has pressed the authentication completion button 13202 to instruct authentication completion. If authentication completion has been instructed (YES in step S14403), the process advances to step S6501; otherwise (NO in step S14403), the process returns to step S14401, and continues the processing procedure.

Since the user has not been correctly authenticated in step S14401, it is not determined in the processing after step S14401 whether the coordinates are correct. The authentication processing continues until the user presses the authentication completion button 13202 to complete the processing. Unless the cancel button 7202 is pressed, the authentication processing continues while maintaining a state in which authentication failure is determined.

As described above, according to the embodiment, it is possible to increase the strength by using, as an aid for user authentication, an arrangement in which a skip image is inserted at a specific frequency and the user recognizes it to perform a skip operation. Authentication is not completed unless the user instructs authentication completion, thereby increasing the strength.

According to the embodiment, the authentication system with the strength higher than that of the authentication system according to the first and second embodiments is implemented by the above-described arrangement. Note that the arrangement within the information processing apparatus 1002 similar to that in the first embodiment has been explained. This embodiment may be implemented by a combination of a server and a user terminal on the network, similarly to the second embodiment.

<Fourth Embodiment>

The fourth embodiment of the present invention will be described with reference to the accompanying drawings. Note that a description of parts common to the above-described embodiments will be omitted. The internal arrangement of an information processing apparatus on which an authentication system according to the embodiment operates, and the tagged image data of the authentication system, tagged image data 3000, a user registration information record, and a user identifier input screen in an authentication UI are similar to those shown in FIGS. 1, 3A to 3C, 4A to 4D, 5, 7A, and 7B.

Figure 18:
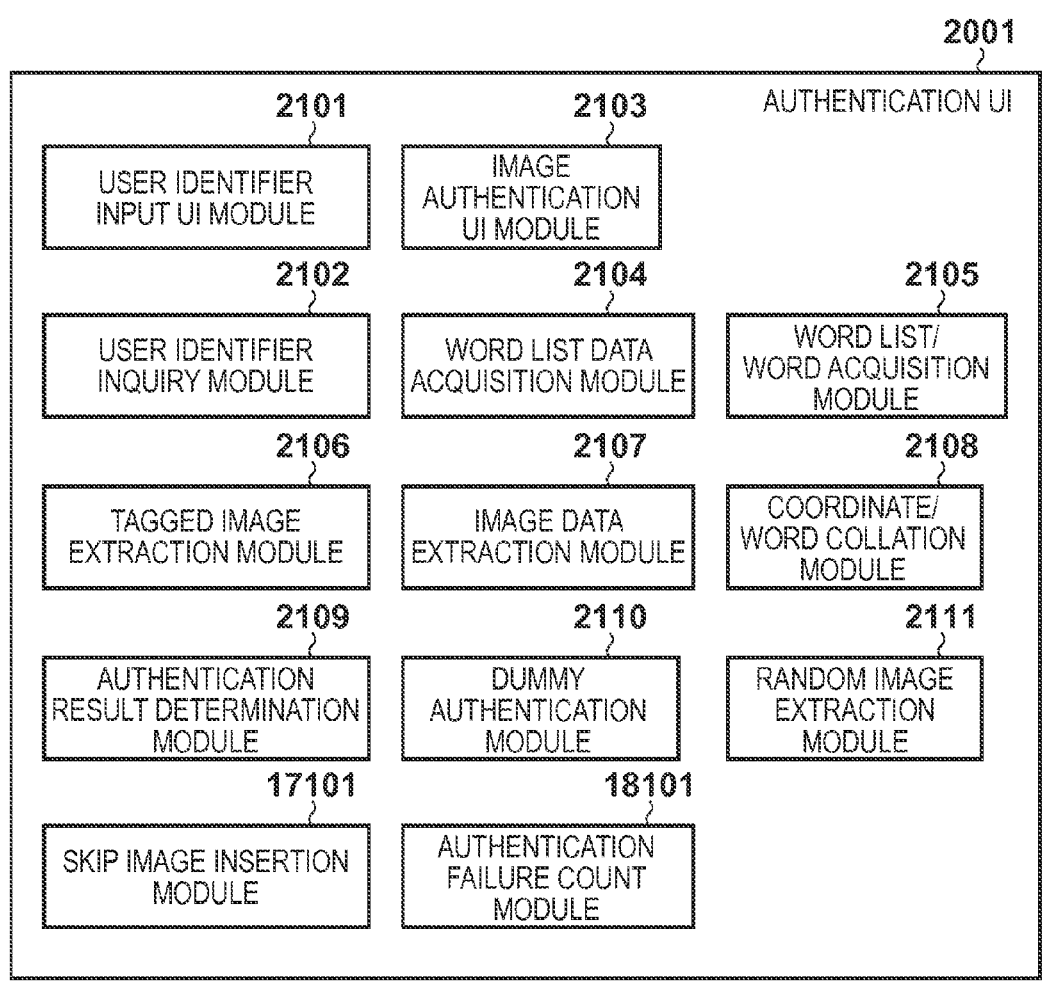
FIG. 18 is a block diagram showing an example of a software module arrangement according to the fourth embodiment.

FIG. 18 schematically shows the module arrangement of the authentication system according to the embodiment. Only different points from FIGS. 2B and 17 will be described. An authentication failure count module 18101 is a module for holding an authentication failure counter which counts the number of times user authentication fails.

FIG. 15 schematically shows an image authentication screen in an authentication UI 2001 of the authentication system according to the embodiment. An image authentication screen 15002 shown in FIG. 15 includes a reset button 15201, a back button 15202, a skip button 13201, an authentication completion button 13202, an image display region 7201, and a cancel button 7202. The reset button 15201 is used by the user to instruct to retry authentication from the beginning. The back button 15202 is used by the user to instruct to retry authentication by the immediately preceding word. The skip button 13201 is used by the user to instruct a skip operation. The authentication completion button 13202 is used by the user to instruct authentication completion.

[Processing Procedure]

The overall operation of the authentication system according to the embodiment will be described with reference to FIGS. 16A to 16D. Only different points from FIGS. 6 and 14 will be explained in detail. Note that in FIGS. 16A to 16D, the same processes as those in FIG. 14 have the same reference symbols.

In this embodiment, an authentication failure counter is used as information indicating the number of times authentication fails and a factor in failure. The authentication failure counter takes −1, 0, or an integer of 1 or larger. For the authentication failure counter, −1 indicates that no correct user identification information has been input, 0 indicates that authentication has not failed, and an integer of 1 or larger indicates that authentication has failed in the authentication processing.

In the embodiment, upon start of user authentication in step S6101 (YES in step S6101), the authentication failure counter is initialized.

Figure 16A:
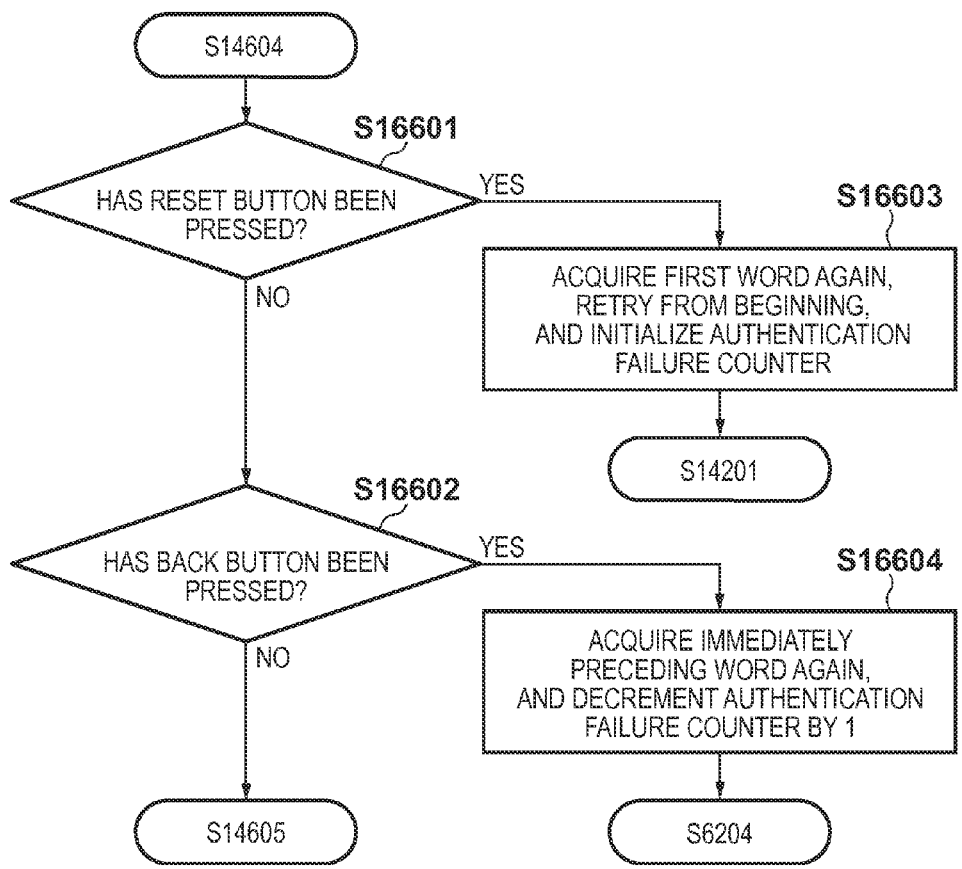
FIGS. 16A, 16B, 16C, and 16D are flowcharts illustrating a processing procedure according to the fourth embodiment.

A procedure in step S14604 and subsequent steps will be described with reference to FIG. 16A. In step S14604, an image authentication UI module 2103 waits for the user to designate coordinates or press one button. When either of the operations is executed, the process advances to step S16601.

In step S16601, the image authentication UI module 2103 determines whether the user has pressed the reset button 15201 to instruct a reset operation. If reset operation has been instructed (YES in step S16601), the process advances to step S16603; otherwise (NO in step S16601), the process advances to step S16602.

In step S16602, the image authentication UI module 2103 determines whether the user has pressed the back button 15202 to instruct to return to authentication by the immediately preceding word. If the user has not instructed to return to authentication by the immediately preceding word (NO in step S16602), the process advances to step S14605; otherwise (YES in step S16602), the process advances to step S16604.

In step S16603, a word list/word acquisition module 2105 clears the word information acquired so far, and acquires the first word of word list data 5003 again, thereby returning to step S14201 to continue the processing procedure. At this time, the authentication failure count module 18101 initializes the authentication failure counter.

In step S16604, the word list/word acquisition module 2105 acquires a word immediately before the currently acquired word in the word list data 5003, thereby continuing the processing from step S6204. At this time, the authentication failure count module 18101 decrements the value of the authentication failure counter by 1.

Figure 16B:
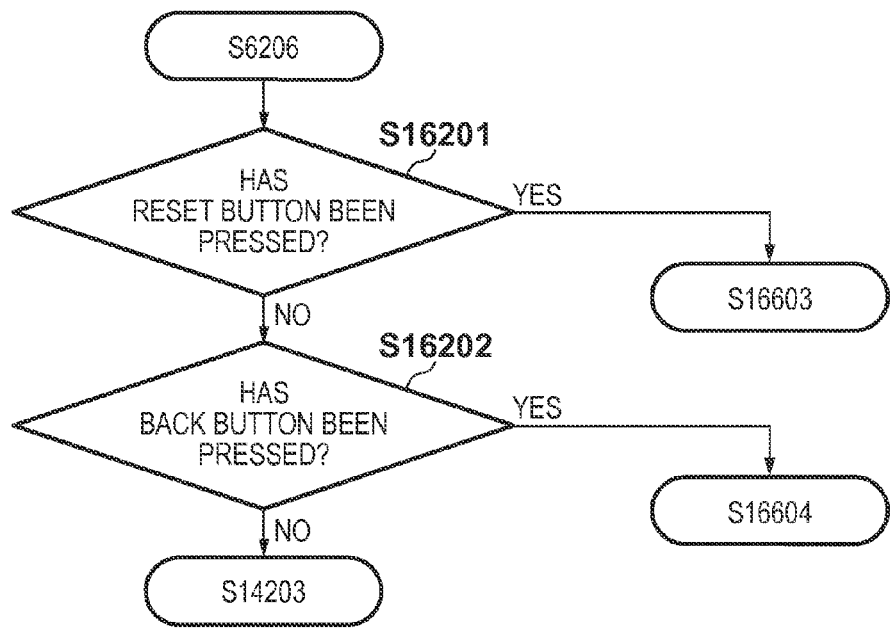

A procedure in step S6206 and subsequent steps will be described with reference to FIG. 16B. If the user designates coordinates or presses one button in step S6206, the process advances to step S16201.

In step S16201, the image authentication UI module 2103 determines whether the user has pressed the reset button 15201 to instruct a reset operation. If no reset operation has been instructed (NO in step S16201), the process advances to step S16202; otherwise (YES in step S16201), the process advances to step S16603.

In step S16202, the image authentication UI module 2103 determines whether the user has pressed the back button 15202 to instruct to return to authentication by the immediately preceding word. If the user has not instructed to return to authentication by the immediately preceding word (NO in step S16202), the process advances to step S14203; otherwise (YES in step S16202), the process advances to step S16604.

Figure 14A:
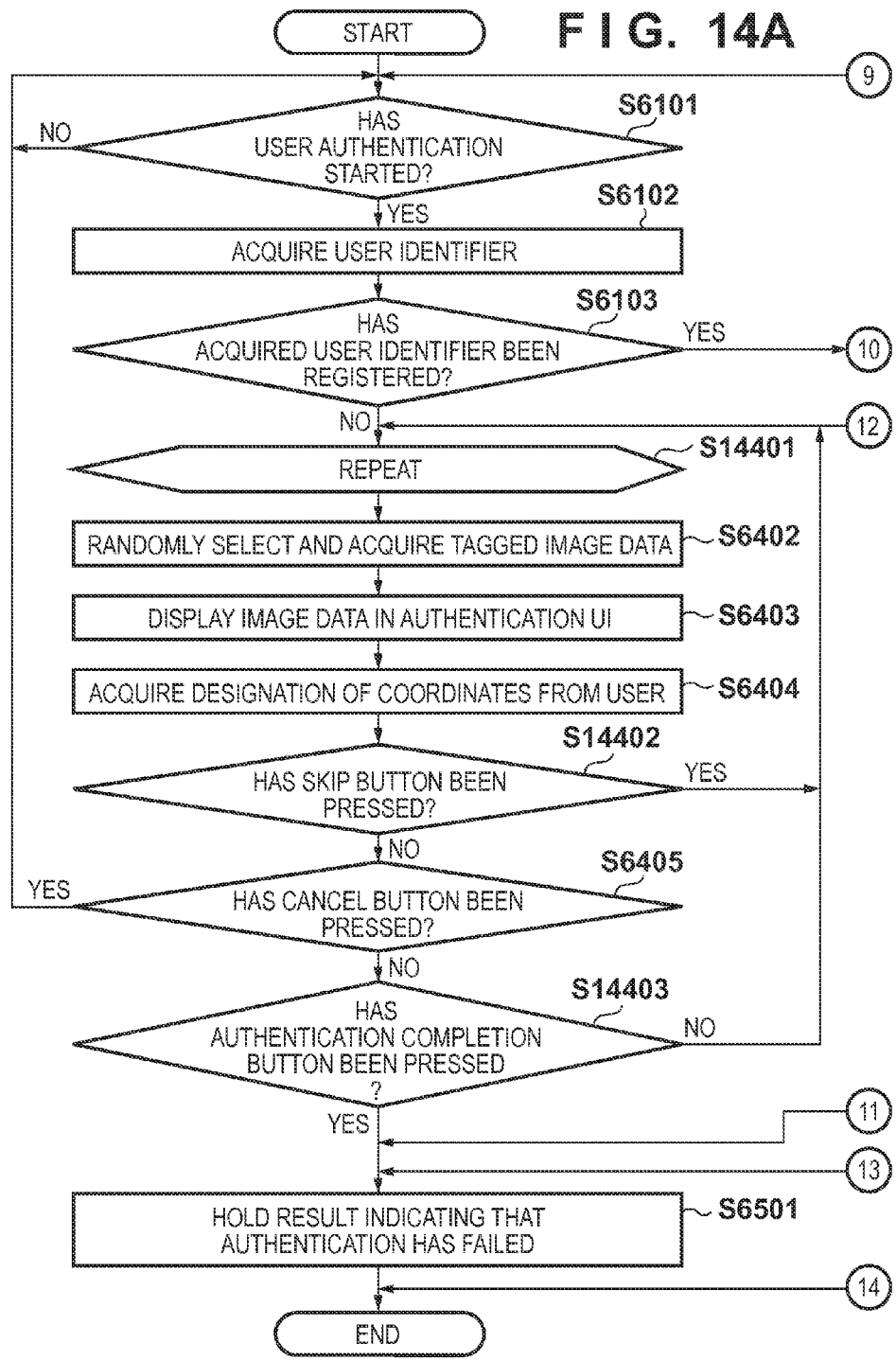
Figure 14C:
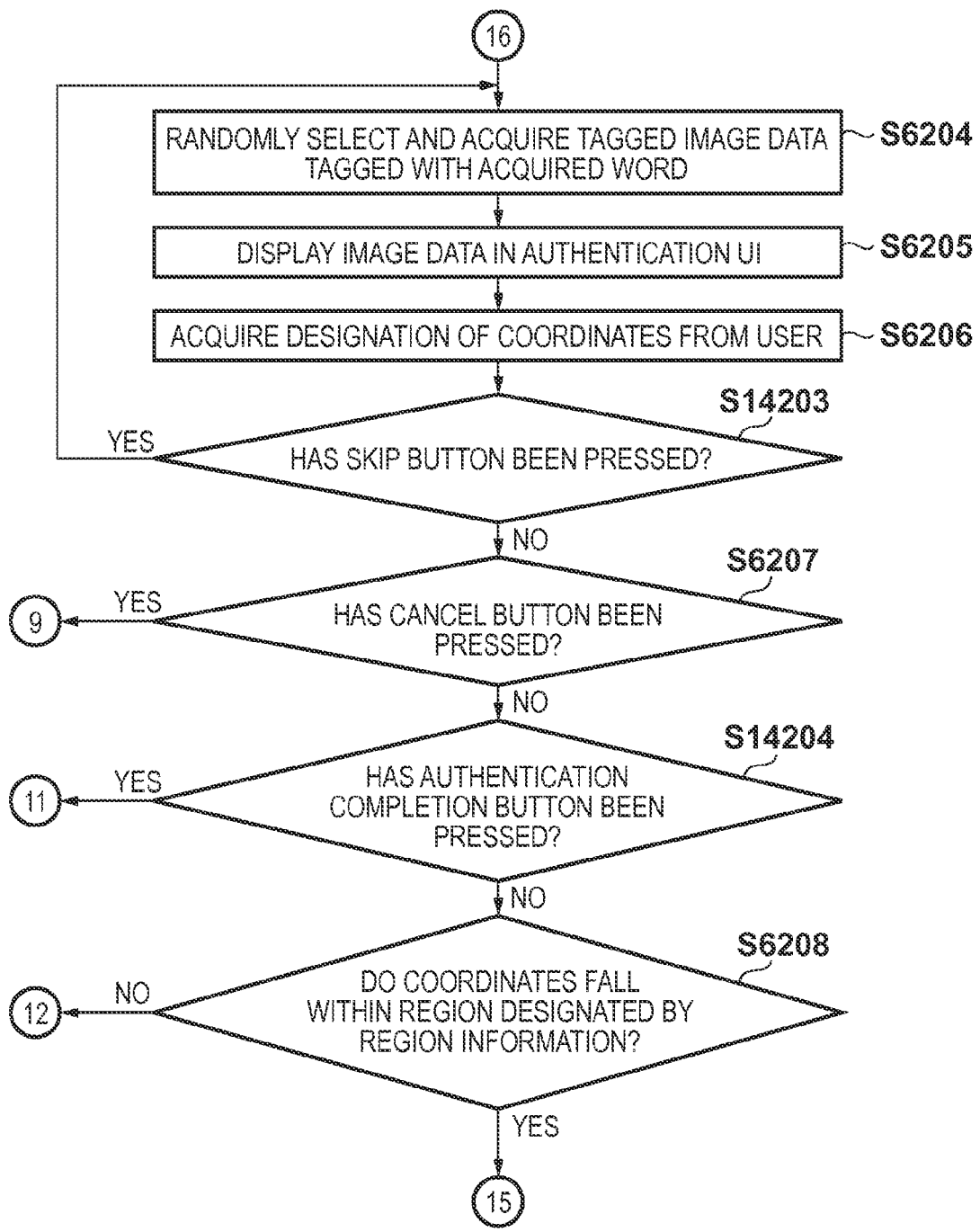
Figure 16C:
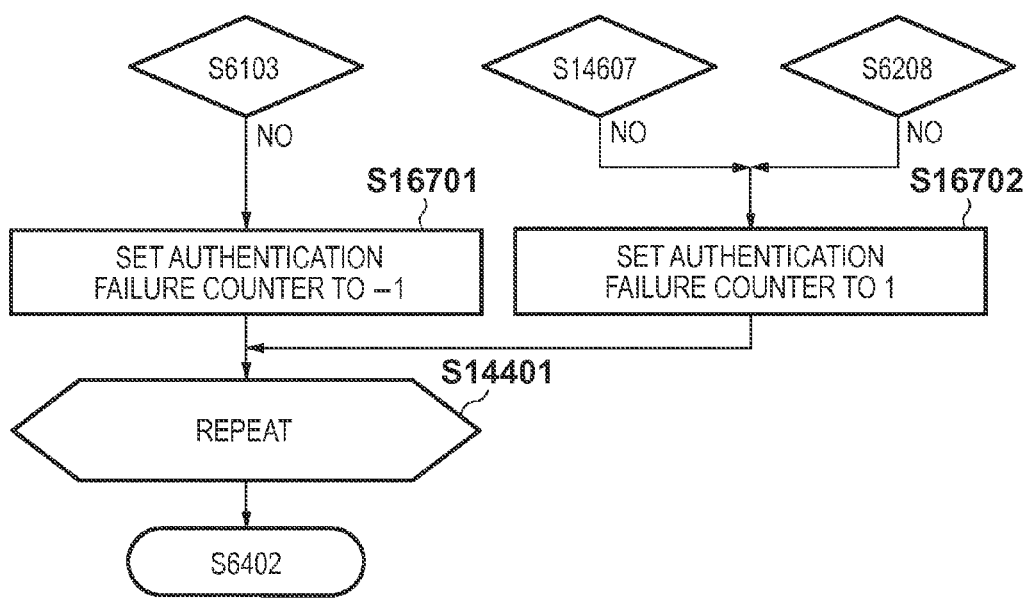

FIG. 16C shows processing when the process advances to step S14401 in FIG. 14. If the process advances from step S6103, processing in step S16701 is executed before entering a loop in step S14401. In step S16701, the authentication failure count module 18101 sets −1 as the value of the authentication failure counter. After that, the processing in step S14401 is executed. Alternatively, if the process advances from step S6208 or S14607, processing in step S16702 is executed before entering the loop in step S14401. In step S16702, the authentication failure count module 18101 sets 1 in the authentication failure counter.

Figure 16D:
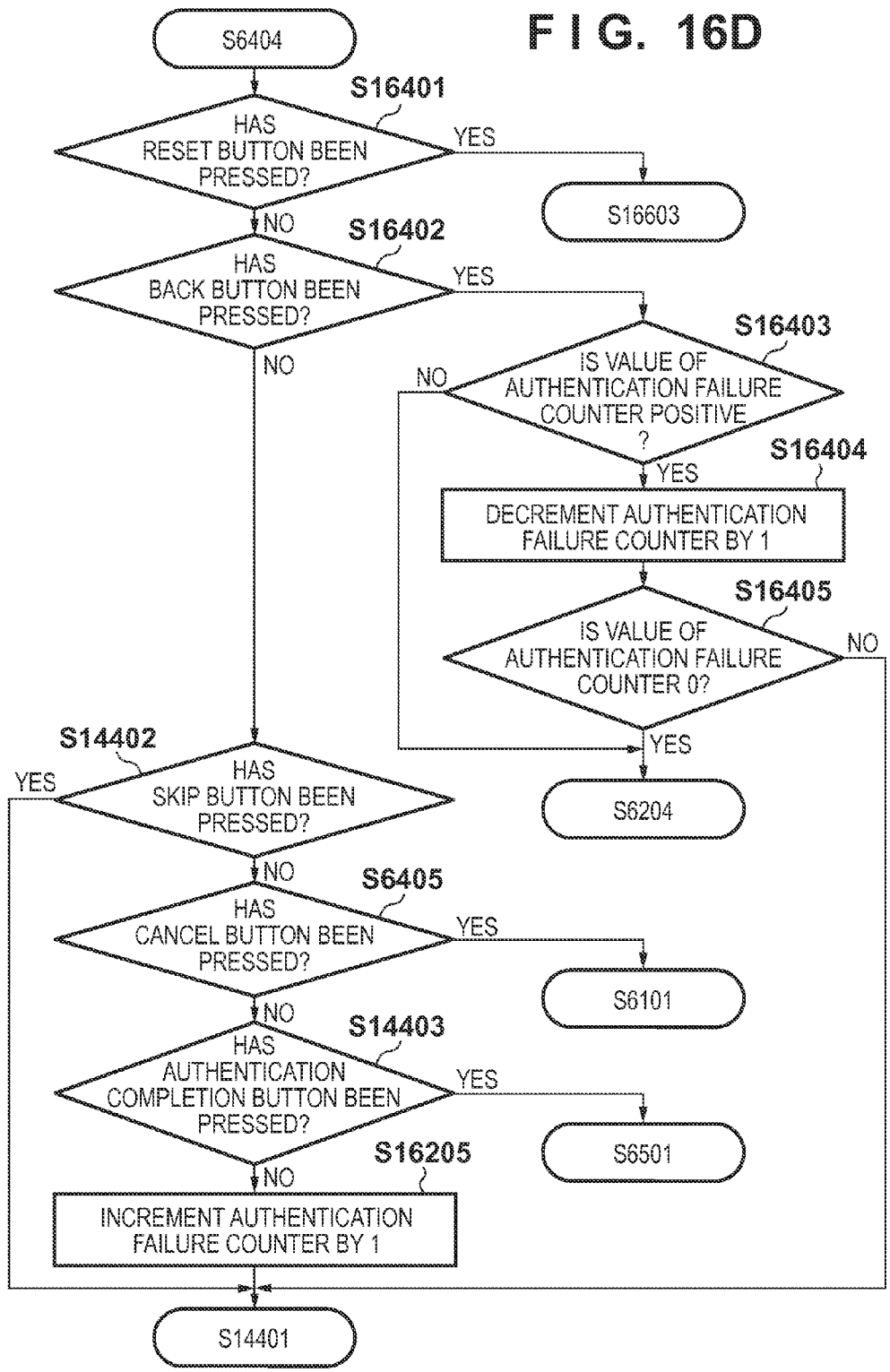

A procedure in step S6404 and subsequent steps will be described with reference to FIG. 16D. If the user designates coordinates or presses one button in step S6404, the process advances to step S16401.

In step S16401, the image authentication UI module 2103 determines whether the user has pressed the reset button 15201 to instruct a reset operation. If no reset operation is instructed (NO in step S16401), the process advances to step S16402; otherwise (YES in step S16401), the process advances to step S16603.

In step S16402, the image authentication UI module 2103 determines whether the user has pressed the back button 15202 to instruct to return to authentication by the immediately preceding word. If the user has not instructed to return to authentication by the immediately preceding word (NO in step S16402), the process advances to step S14402; otherwise (YES in step S16402), the process advances to step S16403.

In step S16403, the authentication failure count module 18101 determines whether the value of the authentication failure counter is a positive value. If the value is a positive value (YES in step S16403), the process advances to step S16404; otherwise (NO in step S16403), the process advances to step S6204.

In step S16404, the authentication failure count module 18101 decrements the value of the authentication counter by 1. The process then advances to step S16405. In step S16405, the authentication failure count module 18101 determines whether the value of the authentication failure counter is 0. If the value is 0 (YES in step S16405), the process returns to step S6204, and continues the processing procedure; otherwise (NO in step S16405), the process returns to step S14401, and continues the processing procedure.

In step S14402, the image authentication UI module 2103 determines whether the user has pressed the skip button 13201 to instruct a skip operation. If a skip operation has been instructed (YES in step S14402), the process advances to step S14401; otherwise (NO in step S14402), the process advances to step S6405.

In step S6405, the image authentication UI module 2103 determines whether the user has pressed the cancel button 7202 to instruct cancellation. If cancellation has been instructed (YES in step S6405), the process advances to step S6101; otherwise (NO in step S6405), the process advances to step S14403.

In step S14403, the image authentication UI module 2103 determines whether the user has pressed the authentication completion button 13202 to instruct authentication completion. If authentication completion has been instructed (YES in step S14403), the process advances to step S6501; otherwise (NO in step S14403), the process advances to step S16205.

In step S16205, the authentication failure count module 18101 increments the value of the authentication failure counter by 1, and the process advances to step S14401.

According to this embodiment, if the user notices to have designated incorrect coordinates in the middle of the authentication processing, he/she can continue the authentication processing by pressing the back button to return to authentication by the immediately preceding word. If the user cannot identify where the authentication processing progresses, he/she can press the reset button to retry authentication from the beginning.

This processing enables the user to retry authentication before authentication finally fails.

More particularly, as measures against a brute force attack, the authentication system may be generally configured so that if user authentication fails a given number of times, authentication for the user does not succeed for a given period of time. In this arrangement, if the user recognizes in the middle of the processing that incorrect authentication has been performed, he/she can retry authentication before the authentication processing fails, which improves usability.

Note that this embodiment may be implemented by a combination of a server and a user terminal on the network instead of the arrangement including the information processing apparatus 1002, similarly to the third embodiment.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-100353, filed Apr. 25, 2012, which is hereby incorporated by reference herein in its entirety.

The invention claimed is:

1. An information processing apparatus for executing authentication processing, compromising:
   a first memory;
   a second memory;
   at least one processor, said at least one processor being configured to function as a determination unit, a specification unit, and an authentication unit; and
   a display,
   wherein said first memory is configured to store, in association with each other, an image, region information indicating a region including in the image, and word information indicating an object linked with the region;
   the determination unit is configured to determine an image to be used for the authentication processing among the images stored in said first memory;
   the display is configured to display the image determined by the determination unit;
   the specification unit is configured to specify, in a case where a user designates a position within the image displayed by the display, word information associated with region information of a region including the position;
   the authentication unit is configured to execute authentication processing using the word information specified by the specification unit, and
   said second memory is configured to store, in association with each other, a user and a word list including at least one piece of word information, and
   wherein if the authentication processing for the user is executed, the determination unit determines at least one image associated with at least one piece of word information included in the word list associated with the user,
   said display displays the at least one image,
   the specification unit specifies at least one piece of word information based on a position designated by the user within the at least one image displayed by said display, and
   if the at least one piece of word information specified by the specification unit matches the at least one piece of word information included in the word list, the authentication unit determines that the authentication has succeeded.

2. The information processing apparatus according to claim 1, wherein said processor is further configured to function as an acceptance unit, the acceptance unit being configured to accept information for specifying a user as an authentication processing target, wherein if said second memory stores no user corresponding to the information accepted by the acceptance unit, the authentication unit determines that the authentication processing has failed, the determination unit randomly determines an image among the images stored in said first memory means, and said display displays the determined image.

3. The information processing apparatus according to claim 1 wherein at least one piece of word information is associated in a single region including in the image.

4. The information processing apparatus according to claim 1, wherein the determination unit changes the image to a different image associated with word information included in the word list, and determines the image for each authentication process.

5. The information processing apparatus according to claim 1, wherein
said display provides a reset button, and
in a case where the user presses the reset button, processing by the determination unit, the specification unit, and the authentication unit is executed from the beginning 6. The information processing apparatus according to claim 1, wherein
said display provides a back button, and
in a case where the user presses the back button, an image which is associated with word information used immediately before current word information and included in the word list, and is different from an image displayed immediately before a current image is used to accept designation of a position from the user.

7. The information processing apparatus according to claim 1, wherein
the determination unit determines at least one image which is not associated with word information included in the word list, and
if the user designates a position within the image which is not associated with the word information included in the word list, the authentication unit determines that the authentication has failed.

8. The information processing apparatus according to claim 7, wherein
said display provides a skip button, and
in a case where the user presses the skip button, acceptance of designation of a position using an image currently displayed is skipped, and a next image is displayed to accept designation of a position from the user.

9. The information processing apparatus according to claim 8, wherein if the skip button is pressed while an image which is not associated with the word information included in the word list is displayed, the authentication unit determines to have accepted a correct instruction for the image from the user.

10. The information processing apparatus according to claim 1, wherein
said display provides a completion button, and
in a case where the user presses the completion button, the authentication unit determines that the authentication has succeeded if at least one piece of word information specified by the specification unit so far matches the at least one piece of word information included in the word list.

11. The information processing apparatus according to claim 1, wherein said display continues to provide an image until the user presses the completion button.

12. The information processing apparatus according to claim 1, wherein said display displays at least one image determined by the determination unit in an order complying with a predetermined standard.

13. An authentication system comprising an information processing apparatus and an authentication server, wherein
said authentication server includes
a first memory;
a second memory;
at least one processor, said at least one processor being configured to function as a determiniation unit, a specification unit, and an authentication unit; and
a transmission unit,
wherein said first memory is configured to store, in association with each other, an image, region information indicating a region included in the image, and word information indicating an object associated with the region,
the determination unit is configured to determine an image to be used for authentication processing among the image stored in said first memory,
said transmission unit is configured to transmit the image determined by the determination unit to said information processing apparatus,
the specification unit is configured to specify, based on a position within the determined image acquired from said information processing apparatus, word information associated with region information of a region including the position,
the authentication unit is configured to execute the authentication processing using the word information specified by the specification unit, and
said second memory is configured to store, in association with each other, a user and a word list including at least one piece of word information, and
said information processing apparatus includes
a reception unit configured to receive the determined image from said authentication server,
a display configured to display the image received by said reception unit, and
at least one processor, said at least one processor being configured to function as a providing unit that provides, in a case where the user designates a position within the image displayed by said display, information of the designated position to the authentication server,
wherein if the authentication processing for the user is executed, the determination unit determines at least one image associated with at least one piece of word information included in the word list associated with the user,
said display displays the at least one image,
the specification unit specifies at least one piece of word information based on a position designated by the user within the at least one image displayed by said display, and
if the at least one piece of word information specified by the specification unit matches the at least one piece of word information included in the word list, the authentication unit determines that the authentication has succeeded.

14. The authentication system according to claim 13, wherein the providing unit transmits only coordinates of the position designated by the user to the authentication server.

15. An authentication method comprising:
storing, in a storage unit, in association with each other, an image region information indicating a region included in the image, and word information indicating an object included in the region;
determining an image to be user for authentication processing among the images stored in the storage unit;
displaying the image determined in the determining step;
specifying, in a case where a user designates a position within the image displayed in the displaying step, word information associated with region information of a region including the position;
executing authentication processing using the word information specified in the specifying step and
storing, in association with each other, a user and a word list including at least one piece of word information,
wherein if the authentication processing for the user is executed, in the determining step, at least one image associated with at least one piece of word information included in the word list associated with the user is determined,
in the displaying step, the at least one image is displayed,
in the specifying step, at least one piece of word information is specified based on a position designated by the user within the at least one image displayed in the displaying step, and
if the at least one piece of word information specified in the specifying step matches the at least one piece of word information included in the word list, in the executing step, it is determined that the authentication has succeeded.

16. A non-transitory, computer-readable program for causing a computer to function as
a storage unit configured to store, in association with each other, an image, region information indicating a region included in the image, and word information indicating an object associated with the region;
a determination unit configured to determine an image to be used for authentication processing among the images stored in the storage unit;
a display unit configured to display the image determined by the determination unit;
a specification unit configured to specify, in a case where a user designates a position within the image displayed by the display unit, word information associated with region information of a region including the position;
an authentication unit configured to execute authentication processing using the word information specified by the specification unit and
a second storage unit configured to store, in association with each other, a user and a word list including at least one piece of word information,
wherein if the authentication processing for the user is executed, said determination unit determines at least one image associated with at least one piece of word information included in the word list associated with the user,
said display unit displays the at least one image,
said specification unit specifies at least one piece of word information based on a position designated by the user within the at least one image displayed by said display unit, and
if the at least one piece of word information specified by said specification unit matches the at least one piece of word information included in the word list, said authentication unit determines that the authentication has succeeded.

* * * * *